(12) United States Patent
Wang et al.

(10) Patent No.: US 11,819,174 B2
(45) Date of Patent: Nov. 21, 2023

(54) CLEANING CONTROL METHOD AND DEVICE, CLEANING ROBOT AND STORAGE MEDIUM

(71) Applicants: Yunjing Intelligence (Shenzhen) Co., Ltd., Guangdong (CN); Yunjing Intelligence Innovation (Shenzhen) Co., Ltd., Guangdong (CN)

(72) Inventors: Zhenxu Wang, Shenzhen (CN); Yu Ai, Shenzhen (CN)

(73) Assignees: Yunjing Intelligence (Shenzhen) Co., Ltd.; Yunjing Intelligence Innovation (Shenzhen) Co., Ltd.

( * ) Notice: Subject to any disclaimer, the term of this patent is extended or adjusted under 35 U.S.C. 154(b) by 0 days.

(21) Appl. No.: 17/949,837

(22) Filed: Sep. 21, 2022

(65) Prior Publication Data
US 2023/0087027 A1 Mar. 23, 2023

(30) Foreign Application Priority Data
Sep. 23, 2021 (CN) .......................... 202111116145.4

(51) Int. Cl.
*A47L 11/40* (2006.01)
*A47L 11/28* (2006.01)

(52) U.S. Cl.
CPC ........... *A47L 11/4011* (2013.01); *A47L 11/28* (2013.01); *A47L 2201/06* (2013.01)

(58) Field of Classification Search
CPC ......... G05D 1/0219; G05D 2201/0203; G05D 2201/0215; A47L 11/24; A47L 11/28;
(Continued)

(56) References Cited

U.S. PATENT DOCUMENTS

| 11,037,320 B1* | 6/2021 | Ebrahimi Afrouzi ..... G06T 7/90 |
| 2011/0167574 A1* | 7/2011 | Stout .................... G05D 1/0234 |
| | | 701/25 |

(Continued)

FOREIGN PATENT DOCUMENTS

| CA | 3136649 A1 | 10/2020 |
| CN | 102644252 A | 8/2012 |

(Continued)

OTHER PUBLICATIONS

CN/202111116145.4, Office Action, dated Apr. 7, 2023.

*Primary Examiner* — Peter D Nolan
*Assistant Examiner* — Ce Li Li
(74) *Attorney, Agent, or Firm* — Leydig, Voit & Mayer, Ltd.

(57) ABSTRACT

A cleaning control method and device including a cleaning robot are provided. The cleaning robot includes a sweeping member and a mopping member which cooperate with each other, and an operating parameter is obtained. A sweeping area formed in real time by the sweeping member, a mopping area formed in real time by the mopping member and a mopped area formed on a lateral side of the cleaning robot are controlled to meet a first preset relationship according to the operating parameter. The first preset relationship includes that a first distance formed between a boundary of the sweeping area closest to the mopped area and a boundary of the mopped area closest to the sweeping area is greater than or equal to a second distance between a boundary of the mopping area closest to the mopped area and a boundary of the mopped area closest to the mopping area.

19 Claims, 14 Drawing Sheets

(58) Field of Classification Search
CPC .............. A47L 11/4011; A47L 11/4038; A47L 11/4041; A47L 2201/04; A47L 2201/06
See application file for complete search history.

(56) References Cited

U.S. PATENT DOCUMENTS

| | | | | |
|---|---|---|---|---|
| 2017/0075353 | A1* | 3/2017 | Tang | A47L 1/02 |
| 2018/0004217 | A1* | 1/2018 | Biber | G05D 1/0221 |
| 2020/0129029 | A1* | 4/2020 | Kim | A47L 11/34 |
| 2021/0030232 | A1* | 2/2021 | Jang | A47L 11/4041 |
| 2021/0030246 | A1* | 2/2021 | Jang | A47L 9/0427 |
| 2021/0228044 | A1* | 7/2021 | Zhang | A47L 11/4091 |
| 2021/0321851 | A1* | 10/2021 | Zhang | A47L 11/4038 |
| 2022/0022718 | A1* | 1/2022 | Wu | A47L 11/4005 |
| 2022/0280009 | A1* | 9/2022 | Tan | A47L 11/4066 |
| 2022/0313046 | A1* | 10/2022 | Klopp | A47L 11/4016 |

FOREIGN PATENT DOCUMENTS

| | | |
|---|---|---|
| CN | 103741618 A | 4/2014 |
| CN | 108113583 A | 6/2018 |
| CN | 108158510 A | 6/2018 |
| CN | 208610764 U | 3/2019 |
| CN | 110362079 A | 10/2019 |
| CN | 110710932 A | 1/2020 |
| CN | 210383772 U | 4/2020 |
| CN | 112515577 A | 3/2021 |
| CN | 112596518 A | 4/2021 |
| CN | 112754358 A | 5/2021 |
| CN | 213653320 U | 7/2021 |
| CN | 113331742 A | 9/2021 |
| EP | 3133459 A1 | 2/2017 |
| JP | 2006325724 A | 12/2006 |
| WO | 2018108144 A1 | 6/2018 |
| WO | 2020134505 A1 | 7/2020 |
| WO | 2021036072 A1 | 3/2021 |

* cited by examiner

CLEANING CONTROL METHOD AND DEVICE, CLEANING ROBOT AND STORAGE MEDIUM

CROSS REFERENCE TO RELATED APPLICATIONS

The present application claims priority to Chinese Patent Application No. 202111116145.4, filed on Sep. 23, 2021, entitled "Cleaning Control Method And Device, Cleaning Robot And Storage Medium."

TECHNICAL FIELD

The present application relates to the technical field of robots, in particular to a cleaning control method, a cleaning control device, a cleaning robot and a storage medium.

BACKGROUND

With the continuous improvement of the material conditions and the technical level of science and technology, the robots are used by more and more families to provide services for people. In particular, the cleaning robots are used to replace human labor to clean the houses or the large places, which not only reduces the intensity of human labor, but also improves the cleaning efficiency.

Currently, a cleaning robot is usually provided with a cleaning member and a driving device. Under the driving of the driving device, the cleaning robot moves according to a preset cleaning path, and cleans the ground surface through the cleaning member. However, for a cleaning robot integrated with both the sweeping function and the mopping function, the cleaning member includes a sweeping member and a mopping member, and the sweeping member and the mopping member may work at the same time, and sweeping and mopping are carried out simultaneously, or the sweeping member and the mopping member may work separately and each time only mopping or sweeping is carried out. In this way, because the ground surface is wet after being mopped by the mopping member, the mopped area will be polluted or dirtied again if contacted by the sweeping member, which has dirt cumulated on it.

In summary, preventing the cleaning member of the robot from polluting or dirtying the ground surface again during the cleaning process is a technical problem in the art that needs to be solved.

SUMMARY

The main object of the present application is to provide a cleaning control method and a cleaning control device, a cleaning robot, and a storage medium, which aim to solve the technical problem of the sweeping member polluting or dirtying the mopped area during the cleaning process.

In order to achieve the above object, the present application provides a cleaning control method applied to a cleaning robot including a sweeping member and a mopping member, the cleaning control method including:

acquiring an operating parameter for the cleaning robot to perform cleaning;

in a process of the sweeping member and the mopping member working together, controlling, according to the operating parameter, a sweeping area formed in real time by the sweeping member, a mopping area formed in real time by the mopping member and a mopped area formed on a lateral side of the cleaning robot to meet a first preset relationship, the first preset relationship including that: a boundary which is close to the mopped area among boundaries of the sweeping area has a first distance from the mopping area, a boundary which is close to the mopped area among boundaries of the mopping area has a second distance from the mopped area, and the first distance is greater or equal to the second distance.

In addition, in order to achieve the above object, the present application further provides a cleaning control device, which is applied to a cleaning robot including a sweeping member and a mopping member; and the cleaning control device includes:

an obtaining module configured to obtain an operating parameter for the cleaning robot to perform cleaning;

a cleaning module configured to control, according to the operating parameter in a process of the sweeping member and the mopping member working together, a sweeping area formed in real time by the sweeping member, a mopping area formed in real time by the mopping member and a mopped area formed on a lateral side of the cleaning robot to meet a first preset relationship, the first preset relationship including that: a boundary which is close to the mopped area among boundaries of the sweeping area has a first distance from the mopping area, a boundary which is close to the mopped area among boundaries of the mopping area has a second distance from the mopped area, and the first distance is greater or equal to the second distance.

The functional modules of the cleaning control device of the present application implement the operations of the cleaning control method as described above during operation.

In addition, in order to achieve the above object, the present application further provides a cleaning robot including a memory, a processor, and a cleaning control program stored in the memory and executable by the processor, the cleaning control program of the cleaning robot is executed by the processor to implement the cleaning control method as described above.

In addition, in order to achieve the above object, the present application further provides a computer storage medium storing a cleaning control program of a cleaning robot, the cleaning control program of the cleaning robot is executed by a processor to implement the the cleaning control method as described above.

In addition, in order to achieve the above object, the present application further provides a computer program product including a computer program. When the computer program is executed by a processor, the cleaning control method as described above are implemented.

The present application provides a cleaning control method, a cleaning control device, a cleaning robot, a computer storage medium, and a computer program product. The cleaning control method is applied to a cleaning robot including a sweeping member and a mopping member. An operating parameter for cleaning the ground is obtained. When the sweeping member and the mopping member perform ground cleaning, a sweeping area formed in real time by the sweeping member, a mopping area formed in real time by the mopping member and a mopped area formed on a lateral side of the cleaning robot are controlled to meet a first preset relationship according to the operating parameter, the first preset relationship includes that a first distance between a boundary of the sweeping area close to the mopped area and the mopped area is greater than or equal to a second distance between a boundary of the mopping area close to the mopped area and the mopped area.

In the cleaning process of sweeping and mopping of the cleaning robot, the cleaning robot firstly obtains the operating parameters of the cleaning robot during cleaning, and then controls the sweeping area formed in real time by the sweeping member, the mopping area formed in real time by the mopping member and the mopped area formed on the lateral side of the cleaning robot to meet the first preset relationship. The boundary of the sweeping area close to the mopped area has a first distance from the mopping area, the boundary of the mopping area close to the mopped area has a second distance from the mopped area, and the first distance is greater or equal to the second distance. In this way, the sweeping member will not pollute the mopped area, or after the sweeping member contacts the mopped area, the mopping member can mop the contacted area, so as to avoid making the mopping area dirty again by the sweeping member.

In this application, when the cleaning robot performs sweeping and mopping, the sweeping area formed in real time by the sweeping member has a boundary close to the mopped area, and the boundary has a first distance from the mopped area. When the first distance is greater than or equal to zero, it indicates that the sweeping area does not cover the mopped area. In this way, it can be avoided to make the mopped area on the lateral side dirty again by the sweeping member, and it can also prevent the sweeping member from getting wet by touching the mopped area. When the first distance is less than zero, it indicates that the sweeping area covers the mopped area. The boundary of the mopping area close to the mopped area has a second distance from the mopped area, and the first distance is greater than or equal to the second distance, so that the mopping area formed in real time can mop and clean the mopped area contacted by the sweeping member, it can be avoided to make the mopped area on the lateral side dirty again by the sweeping member, and the cleaning efficiency of the cleaning robot on the ground is improved.

DETAILED DESCRIPTION OF THE EMBODIMENTS

It should be understood that the specific embodiments described herein are merely, used to explain the present application, and are not intended to limit the present disclosure.

Figure 1:
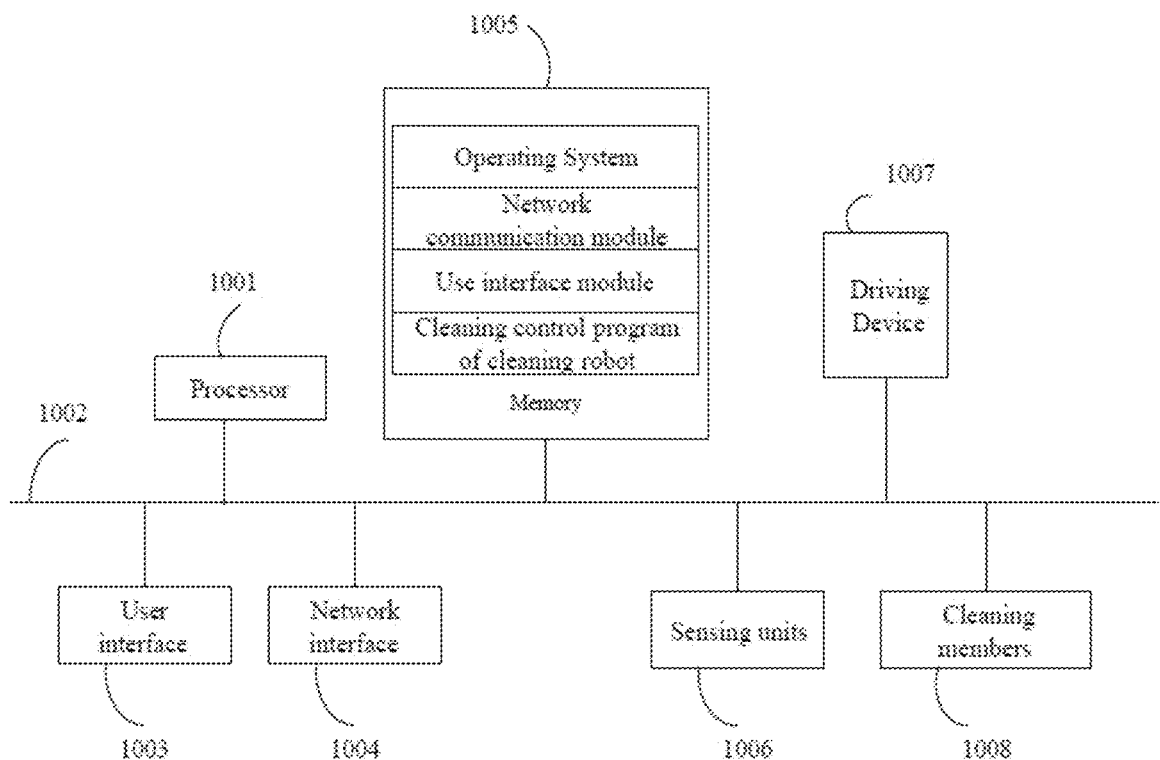
FIG. 1 is a schematic diagram of a device structure of a cleaning robot according to an embodiment of this application.

FIG. 1 is a schematic diagram of the structure of a cleaning robot according to an embodiment of the present application. The cleaning robot can be used for automatically cleaning a ground surface, and the application scenarios can be household cleaning, large place cleaning and the like.

The cleaning robot can be a sweeping cleaning robot, a mopping cleaning robot, and a sweeping and mopping cleaning robot. The cleaning robot is provided with a cleaning member and a driving device, and the driving device may include a motor and a driving wheel. The driving device moves the cleaning robot according to a preset cleaning path, and cleans the ground surface through the cleaning member.

For a sweeping cleaning robot, the cleaning member is a sweeping member, and the sweeping cleaning robot is provided with a dust suction device. During the cleaning process, the sweeping member sweeps dust, garbage, and the like, to a dust suction port of the dust suction device, which absorbs the dust, garbage and the like for storage.

For a mopping cleaning robot, the cleaning member is a mopping member (such as a mop). The mopping member is in contact with the ground and mops and cleans the ground during the moving process of the cleaning robot.

For a sweeping and mopping cleaning robot, the cleaning member includes a sweeping member and a mopping member, and the sweeping member and the mopping member may work at the same time to mop and sweep, or may work alone to mop or sweep. The sweeping member may further include a side brush and a rolling brush (also referred to as a middle brush). The side brush sweeps garbage such as dust on an outer side to a middle area, and the rolling brush sweeps the garbage to the dust suction device.

The cleaning robot according to the embodiment of the present application may be an all-in-one sweeping and mopping robot which includes a sweeping member and a mopping member. In addition, the cleaning robot according to the embodiments of the present application of course can be another type which includes a sweeping member to carry out the sweeping function and a mopping member to carry out the mopping function.

As shown in FIG. 1, the cleaning robot may include a processor 1001, for example, a CPU, a communication bus 1002, a user interface 1003, a network interface 1004, a memory 1005, sensing units 1006, a driving device 1007 and cleaning members 1008. The driving device may include a motor and a driving wheel. The communication bus 1002 is configured to implement connection and communication among the processor 1001, the user interface 1003, the network interface 1004, the memory 1005, the sensing units 1006, the driving device 1007 and the cleaning members 1008. The user interface 1003 may include a display screen, an input unit such as a keyboard, and the user interface 1003 may optionally further include a standard wired interface and a wireless interface. The network interface 1004 may optionally include a standard wired interface, and a wireless interface (such as a Wi-Fi interface).

The memory 1005 is disposed on a robot body, and a program is stored in the memory 1005. The program realizes corresponding operations when being executed by the processor 1001. The memory 1005 is further configured to store parameters for use by the cleaning robot. The memory 1005 may be a high-speed RAM memory or a non-volatile memory, such as a magnetic disk memory. The memory 1005 may optionally be a storage device independent of the foregoing processor 1001.

The cleaning robot may communicate with a user terminal through the network interface 1004. The cleaning robot may also communicate with a base station through a short-range communication technology. The base station is a cleaning device that cooperates with the cleaning robot.

Figure 20:
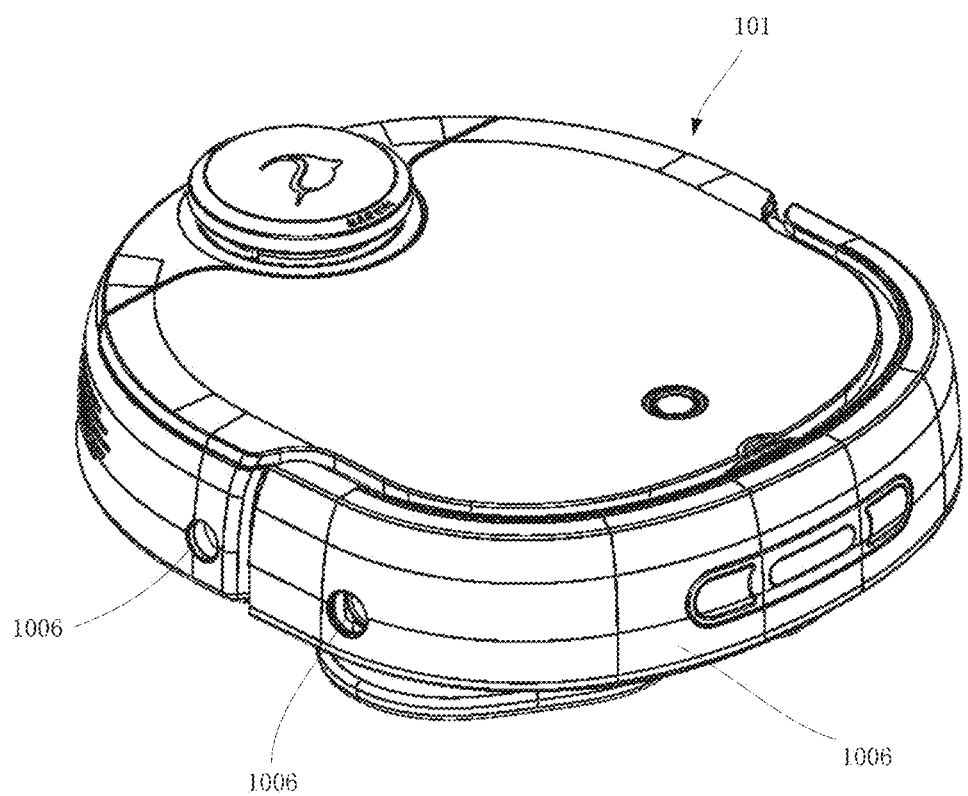
FIG. 20 is a schematic perspective view of the cleaning robot according to an embodiment of the present application.
Figure 21:
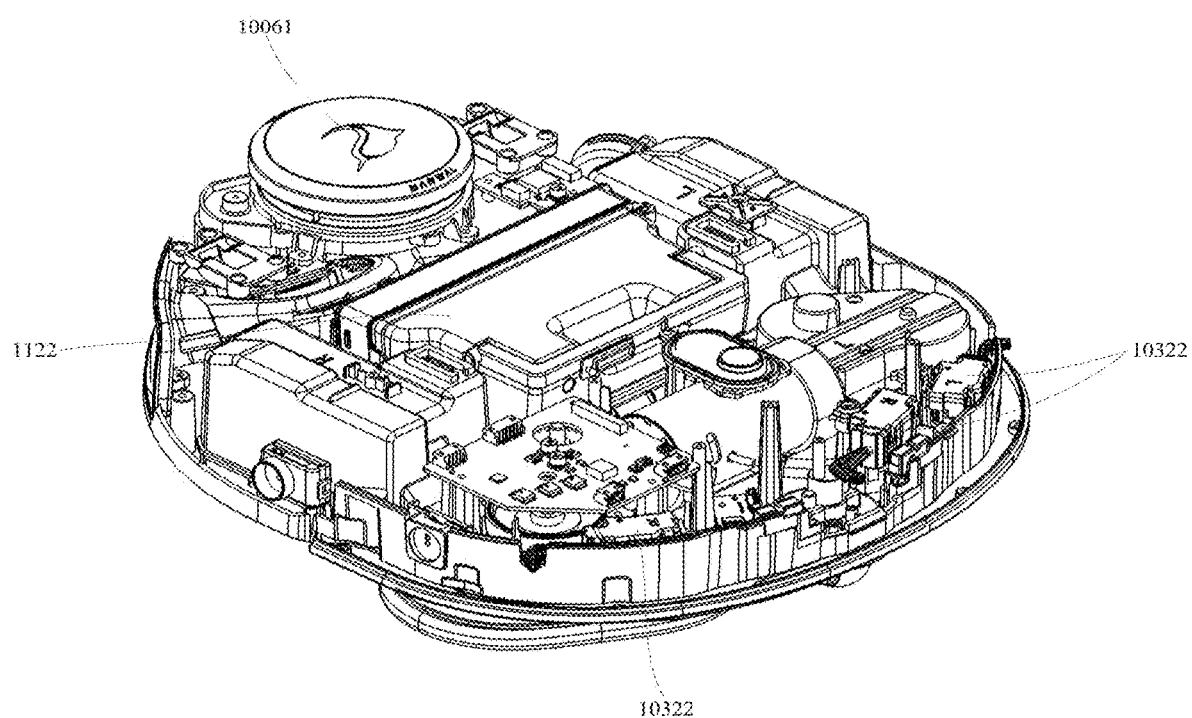
FIG. 21 is a schematic view of the cleaning robot provided by an embodiment of the present application after a portion of a shell is removed.
Figure 22:
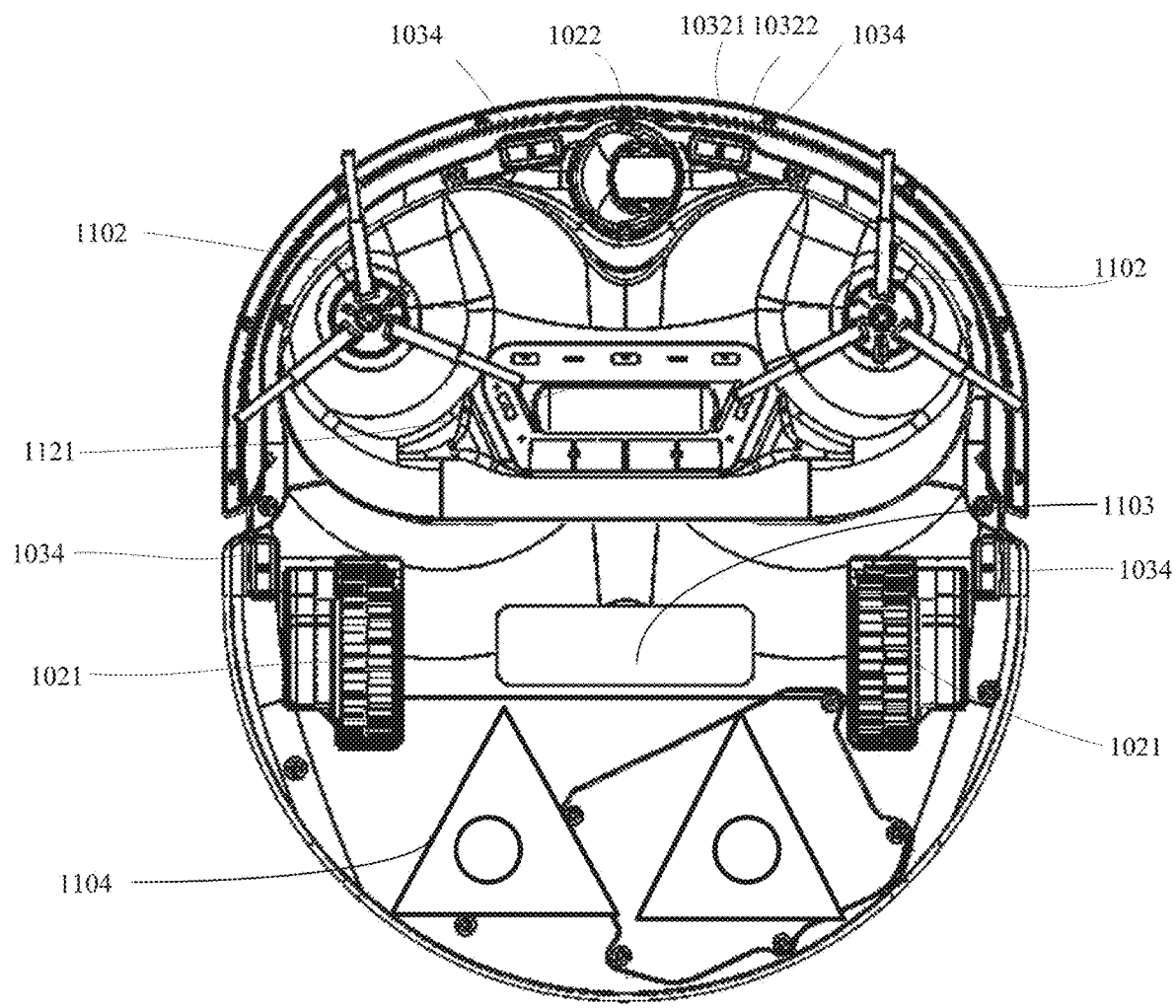
FIG. 22 is a bottom view of the cleaning robot provided in an embodiment of the present application.
Figure 23:
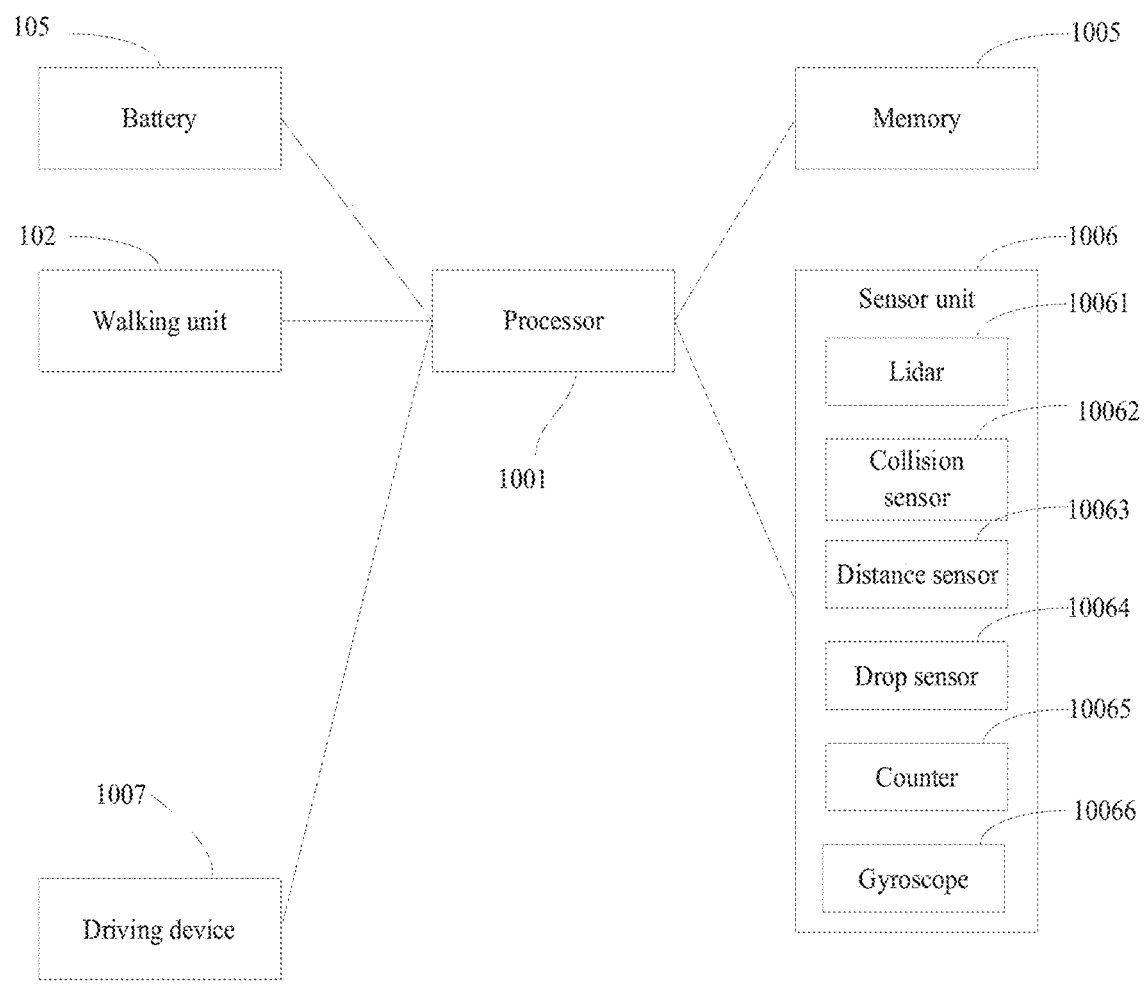
FIG. 23 is another structural diagram of the cleaning robot provided in an embodiment of the present application. The implementation of the purposes, function characteristics and advantages of the present application will be further described with reference to the accompanying drawings.

As shown in FIGS. 20 to 23, the cleaning robot includes a robot body 101, a walking unit 102, sensing units 1006. The robot body 101 may have various structures. In the embodiment of the present application, the robot body 101 has a D-shaped structure as an example. As shown in FIG. 20, the robot body 101 of the D-shaped structure includes a square structure body disposed at the front and a semicircular structure body disposed at the rear. The square structure body can be a rectangular structure with rounded front edges. The square structure body is connected with the semicircular structure body. In a forward movement direction of the cleaning robot, the square structure body is located in front of the semicircular structure body, that is, a direction from the semicircular structure to the square structure is the forward movement direction of the cleaning robot. As shown in FIG. 23, the processor 1001 is provided inside the robot body 101, and is configured to control the mobile robot to perform specific operations. The processor 1001 is electrically connected to components such as a battery 105, the memory 1005, the driving device 1007, a walking unit 102, sensing units 1006 to control those components.

The battery 105 is provided inside the robot body 101, and the battery 105 is provided to provide power to the cleaning robot.

The sensing units 1006 include the lidar 10061, the collision sensor 10062, the distance sensor 10063, the drop sensors 10064, the counter 10065, and the gyroscope 10066.

The lidar 10061 is set on a top of the robot body. When working, the lidar rotates and emits a laser signal through a transmitter on the lidar. The laser signal is reflected by the obstacle, so that a receiver of the lidar receives the laser signal reflected by the obstacle. A circuit unit 100611 of the lidar can obtain surrounding environment information by analyzing the received laser signal, such as a distance and an angle of the obstacle relative to the lidar. In addition, a camera may also be configured instead of lidar, and the distance and angle of the obstacle relative to the camera can also be Obtained by analyzing the obstacle in an image taken by the camera.

As shown in FIGS. 21 and 22, the collision sensor 10062 includes a collision housing 10321 and a trigger sensor 10322. The collision housing surrounds a head of the robot body. Specifically, the collision housing is provided at the head of the robot body and front positions of left and right sides of the robot body. The trigger sensor is arranged inside the robot body and behind the collision housing. An elastic buffer is provided between the collision housing and the robot body. When the cleaning robot collides with an obstacle through the collision housing, the collision housing moves towards the inside of the cleaning robot and compresses the elastic buffer. After the collision housing moves a certain distance towards the inside of the cleaning robot, the collision housing contacts the trigger sensor, and the trigger sensor is triggered to generate a signal, which can be sent to the controller inside the robot body for processing. After colliding the obstacle, the cleaning robot moves away from the obstacle, and the collision housing moves back to the original position under the action of the elastic buffer. It can be seen that the collision sensor can detect the obstacle and play a buffering role when it collides with the obstacle.

The distance sensor 10063 may specifically be an infrared detection sensor, which may be configured to detect a distance from the obstacle to the distance sensor. The distance sensor is arranged on a lateral side of the robot body, so that a distance from the obstacle located near the lateral side of the cleaning robot to the distance sensor can be measured by the distance sensor. The distance sensor may also be an ultrasonic distance measuring sensor, a laser distance measuring sensor or a depth sensor, which is not limited herein.

The drop sensor 10064 may be provided on a bottom edge of the robot body and a quantity of the drop sensor can be one or more. When the cleaning robot moves to an edge of the ground, the drop sensor can detect that the cleaning robot is at risk of falling from a height, so as to perform a corresponding anti-drop response, for example, the cleaning robot stops moving or moves away from the falling position and so on.

A counter 10065 and the gyroscope 10066 are further provided inside the robot body. The counter is configured to accumulate a total rotation angle of the driving wheel to calculate a distance the driving wheel drives the cleaning robot to move. The gyroscope is configured to detect the rotation angle of the cleaning robot, so that an orientation of the cleaning robot can be determined.

As shown in FIG. 22, the cleaning robot also includes a side brush 1102, a rolling brush (middle brush) 1103, a mopping member 1104, configured to sweep, mop and clean the floor. The cleaning robot is further provided with a dust suction device including a dust suction port 1121 provided at the bottom of the robot body 101, a dust box 1122 provided inside the robot body 101. The side brush 1102 is disposed on the rotating shaft at the bottom of the cleaning robot 1001. After the rotating shaft drives the side brush 1102, the rotating side brush 1102 sweeps garbage such as dust to the vicinity of the dust suction port 1121 at the bottom of the cleaning robot.

The walking unit 102 is a component related to the movement of the cleaning robot, and includes a drive wheel 1021 and a universal wheel 1022. The drive wheel 1021 is provided to drive the cleaning robot to move, that is, to drive the robot body 101 to move, the universal wheel 1022 and the drive wheel 1021 cooperate to realize steering and movement of the mobile robot. Specifically, there may be two drive wheels 1021. The two drive wheels 1021 are arranged at a position slightly back from the middle of the bottom of the robot body 101, one of the drive wheels 1021 is arranged at the left side and the other of the drive wheels 1021 is arranged at the right side respectively, and the universal wheel 1022 is arranged at a front position of the bottom of the robot body 101; specifically on the central axis of the mobile robot.

Each drive wheel 1021 is provided with a drive wheel motor, and the drive wheel 1021 rotates under the drive of the drive wheel motor. As a result, the drive wheel provides the cleaning robot with moving power, that is, after the drive wheel 1021 rotates, the cleaning robot is driven to move. The drive wheels 1021 and the universal wheel 1022 cooperate to realize the movement and steering of the cleaning robot. After the drive wheel 1021 rotates, the cleaning robot can be driven to move forward or backward. By controlling a rotation speed difference between left and right drive wheels 1021, a steering angle of the cleaning robot can be controlled.

Those skilled in the art may understand that the structure of the cleaning robot shown in FIGS. 1 and 20-23 does not constitute a limitation on the cleaning robot, which may include more or fewer components than illustrated, or with some components combined, or have a different component arrangement.

As shown in FIG. 1, the memory 1005, as a computer storage medium, may include an operating system, a network communication module, a user interface module, and a cleaning control program of a cleaning robot.

In the cleaning robot shown in FIG. 1, the network interface 1004 is mainly configured for connecting a base station, a charging base and the like which are cooperate with the cleaning robot, and performs data communication with the base station. The base station can be used for charging the cleaning robot, cleaning the cleaning member of the cleaning robot, and the like. The user interface 1003 is mainly configured for connecting a client and performing data communication with the client, and the processor 1001 may be used for invoking a cleaning control program of the cleaning robot stored in the memory 1005, and executing the following operations:

obtaining an operating parameter for the cleaning robot to perform cleaning;

in response to the sweeping member and the mopping member working together, controlling, according to the operating parameter, a sweeping area formed in real time by the sweeping member, a mopping area formed in real time by the mopping member and a mopped area formed on a lateral side of the cleaning robot to meet a first preset relationship, the first preset relationship including that: a first distance between a boundary of the sweeping area close to the mopped area and the mopping area is greater than or equal to a second distance between a boundary of the mopping area close to the mopped area and the mopped area.

Further, the sweeping area formed in real time by the sweeping member, the mopping area formed in real time by the mopping member and the mopped area formed on the lateral side of the cleaning robot meet a second preset relationship, and the second preset relationship including that a third distance between a boundary of the sweeping area away from the mopped area and the mopped area is greater than or equal to a fourth distance between a boundary of the mopping area away from the mopped area and the mopped area.

Further, the processor 1001 may invoke the cleaning control program of the cleaning robot stored in the memory 1005, and further perform the following operations:

controlling the first distance to be greater than or equal to zero, to prevent the sweeping area from touching the mopped area; and/or controlling the second distance to be less than or equal to zero, to make the mopping area adjacent to or cover the mopped area.

Further, the processor 1001 may invoke the cleaning control program of the cleaning robot stored in the memory 1005, and further perform the following operations:

controlling a position or an operating state of the mopping member, to make the mopping area of the mopping member close to the mopped area; and/or, controlling a position or an operating state of the sweeping member, to make the sweeping area of the sweeping member stay away from the mopped area.

Further, the operating parameter is the position of the sweeping member, and the position of the sweeping member is on at least one of a left side and a right side of the cleaning robot; the left side and the right side of the cleaning robot are each provided with a sweeping member, and the processor 1001 may invoke the cleaning control program of the cleaning robot stored in the memory 1005, and further perform the following operations:

controlling a target sweeping member close to the mopped area to not work, be in a designated area, or be lifted, wherein a cleaning area of the target sweeping member exceeds a sideline of the sweeping area or is adjacent to the sideline of the sweeping area, wherein the sideline of the sweeping area is parallel to a boundary extension line of the cleaning robot that is in accordance with an advancing direction of the cleaning robot.

Further, the processor 1001 may invoke the cleaning control program of the cleaning robot stored in the memory 1005, and further perform the following operations:

in response to that the cleaning robot cleans along a sidewinding path, alternately controlling the target sweeping member which is close to the mopped area among target sweeping members on the left side and the right side of the cleaning robot to not work, be in a designated area or be lifted.

Further, the processor 1001 may invoke a cleaning control program of the cleaning robot stored in the memory 1005, and further perform the following operations:

in response to that the cleaning robot cleans along a spiral path, controlling the target sweeping member of the cleaning robot, which is close to the mopped area, to not work, be kept in the designated area, or be lifted continuously.

Further, the operating parameter includes a relative position relationship between the sweeping member and the mopping member, and the processor 1001 may invoke the cleaning control program of the cleaning robot stored in the memory 1005, and further perform the following operations:

during a cleaning process, controlling the sweeping member and/or the mopping member to carry out at least one of the actions: translating, floating, swing, and being lifted, so as to change the sweeping area of the sweeping member and/or the mopping area of the mopping member in a direction perpendicular to the advancing direction of the cleaning robot.

Further, the processor 1001 may invoke the cleaning control program of the cleaning robot stored in the memory 1005, and further perform the following operations:

in response to that the cleaning robot cleans along the side-winging path, alternately controlling the sweeping members, which are close to the mopped area, to be away from the mopped area.

Further, the operating parameter is a relative position relationship between the sweeping member and the mopping member, and the processor 1001 may invoke the cleaning control program of the cleaning robot stored in the memory 1005, and further perform the following operations:

adjusting a relative position relationship between a target sweeping member and the mopping member, where the sweeping area of the target sweeping member exceeds or is aligned with a target boundary extension line of the mopping area, and the target boundary extension line is a boundary extension line parallel to the advancing direction of the cleaning robot; and controlling the target sweeping member and the mopping member to clean after the relative position relationship is adjusted, where the sweeping area formed in real time by the sweeping member after the relative position relationship is adjusted, the mopping area formed in real time by the mopping member after the relative position relationship is adjusted and the mopped area meet the first preset relationship.

Further, the processor 1001 may invoke the cleaning control program of the cleaning robot stored in the memory 1005, and further perform the following operations:

controlling the target sweeping member and/or the mopping member to carry out at least one of the actions: translating, floating, swing, and being lifted, so as to change the sweeping area of the sweeping member and/or the mopping area of the mopping member in a direction perpendicular to the advancing direction of the cleaning robot.

Further, the processor 1001 may invoke the cleaning control program of the cleaning robot stored in the memory 1005, and further perform the following operations:

in response to that the cleaning robot cleans along a sidewinding path, alternately controlling the target sweeping members, which are close to the mopped area, to be away from the mopped area.

Further, the operating parameter is a spiral path, one side of the cleaning robot is provided with a target sweeping member, a sweeping area of the target sweeping member exceeds or aligned with a target boundary extension line of the mopping area, and the target boundary extension line is a boundary extension line parallel to the advancing direction of the cleaning robot. The processor 1001 may invoke the cleaning control program of the cleaning robot stored in the memory 1005, and further perform the following operations:

controlling the cleaning robot to clean along the spiral path, and the sweeping area formed in real time by the sweeping member, the mopping area formed in real time by the mopping member and the mopped area formed on the lateral side of the cleaning robot meeting the first preset relationship.

Further, only the left side of the cleaning robot is provided with the target sweeping member, or only the target sweeping member located on the left side of the cleaning robot is in a working state, and the processor 1001 may invoke the cleaning control program of the cleaning robot stored in the memory 1005, and further perform the following operations:

controlling the cleaning robot to clean along the spiral path from outside to inside in a counterclockwise direction, or controlling the cleaning robot to clean along the spiral path from inside to outside in a clockwise direction.

Further, only the right side of the cleaning robot is provided with the target sweeping member, or only the target sweeping member located on the right side of the cleaning robot works, and the processor 1001 may invoke the cleaning control program of the cleaning robot stored in the memory 1005, and further perform the following operations:

controlling the cleaning robot to clean along the spiral path from outside to inside in a clockwise direction, or controlling the cleaning robot to clean along the spiral path from inside to outside in a counterclockwise direction.

Further, before or after the operation of controlling the cleaning robot to clean along the spiral path from outside to inside in the counterclockwise direction, the processor 1001 may invoke the cleaning control program of the cleaning robot stored in the memory 1005, and further perform the following operations:

controlling the cleaning robot to clean along a left border.

Further, before or after the operation of controlling the cleaning robot to clean along the spiral path from outside to inside in a clockwise direction, the processor 1001 may invoke the cleaning control program of the cleaning robot stored in the memory 1005, and further perform the following operations:

controlling the cleaning robot to clean along a right border.

Based on the structure of the above cleaning robot, various embodiments of a cleaning control method of the present application are provided.

It should be noted that, in various embodiments of the cleaning control method of the present application, the sweeping member and the mopping member of a sweeping and mopping cleaning robot may work together, for example, the sweeping member and the mopping member work simultaneously, or the sweeping member and the mopping member work alternately. Of course, the sweeping member and the mopping member may also work separately, that is, only the sweeping member works to sweep, or only the mopping member works to mop.

Figure 3:
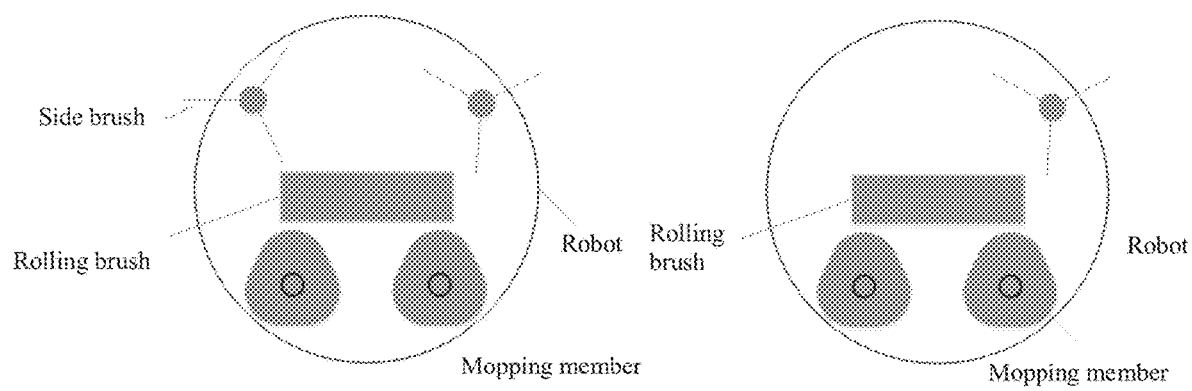
FIG. 3 is a schematic layout diagram of structures at a bottom of the cleaning robot according to the cleaning control method of the present application.

According to the layout of structures at a bottom of the cleaning robot shown in FIG. 3, the sweeping member of the cleaning robot may further include a pair of side brushes and a rolling brush (also referred to as a middle brush and a middle sweeper). As shown in the left part of FIG. 3. one side brush is mounted on each of the left side and the right side of the cleaning robot, and as shown in the right part of FIG. 3, only one side brush is provided and located on the right side of the cleaning robot. When the cleaning robot sweeps the ground using the sweeping member, each side brush sweeps garbage such as dust on the outer side to the middle area, and the rolling brush sweeps the garbage in the middle area to the dust suction device.

In general, the sweeping member can be arranged on a front side of the mopping member, so that when the sweeping member and the mopping member work together, the cleaning robot can sweep at the front side and mop at the rear side, and as compared with arranging the sweeping member behind the mopping member, the sweeping member can be prevented from being wetted by the mopped wet area of the mopping member, and the mopped area in front of the dirty sweeping member can be prevented from being polluted.

Figure 4:
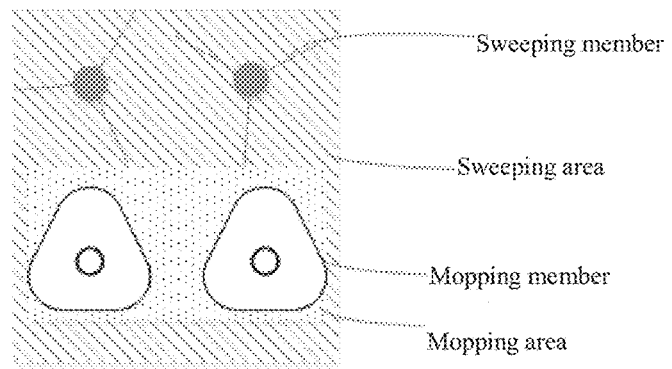
FIG. 4 is a demonstrated schematic diagram of a position relationship between a sweeping area and a mopping area in the present application.

Optionally, a width of the sweeping area formed by the sweeping member in a direction which is perpendicular to the advancing direction, is greater than or equal to a width of the mopping area formed by the mopping member in the direction perpendicular to the advancing direction. As shown in FIG. 4, the sweeping member is in front of the mopping member, thus when the cleaning robot cleans, the mopping area mopped by the mopping member in real time is a swept area which has been swept by the sweeping member.

After the cleaning robot mops the ground using the mopping member, the ground surface becomes wet. If the sweeping member contacts the mopped area formed by mopping the ground surface during the cleaning process, the sweeping member is wetted, and the wet sweeping member will pollute the cleaned ground. For example, during the cleaning process of the cleaning robot, the cleaning robot turns back or when the cleaning robot cleans along a sidewinding path in the scenario shown in FIG. 5, the sweeping member may pollute the mopped area. In particular, the cleaning robot starts mopping and sweeping from a right starting point and passes a first position and a second position one after another, when the cleaning robot is in the second position, the sweeping member may sweep an area the mopping member has already mopped when the cleaning robot is in the first position, causing the sweeping member to get wet and pollute the mopped area. In other scenarios, when the rolling brush passes through the second position, the rolling brush may sweep the area the mopping member has already mopped when the cleaning robot is in the first position, causing the rolling brush to get wet and pollute the area having been mopped.

Figure 2:
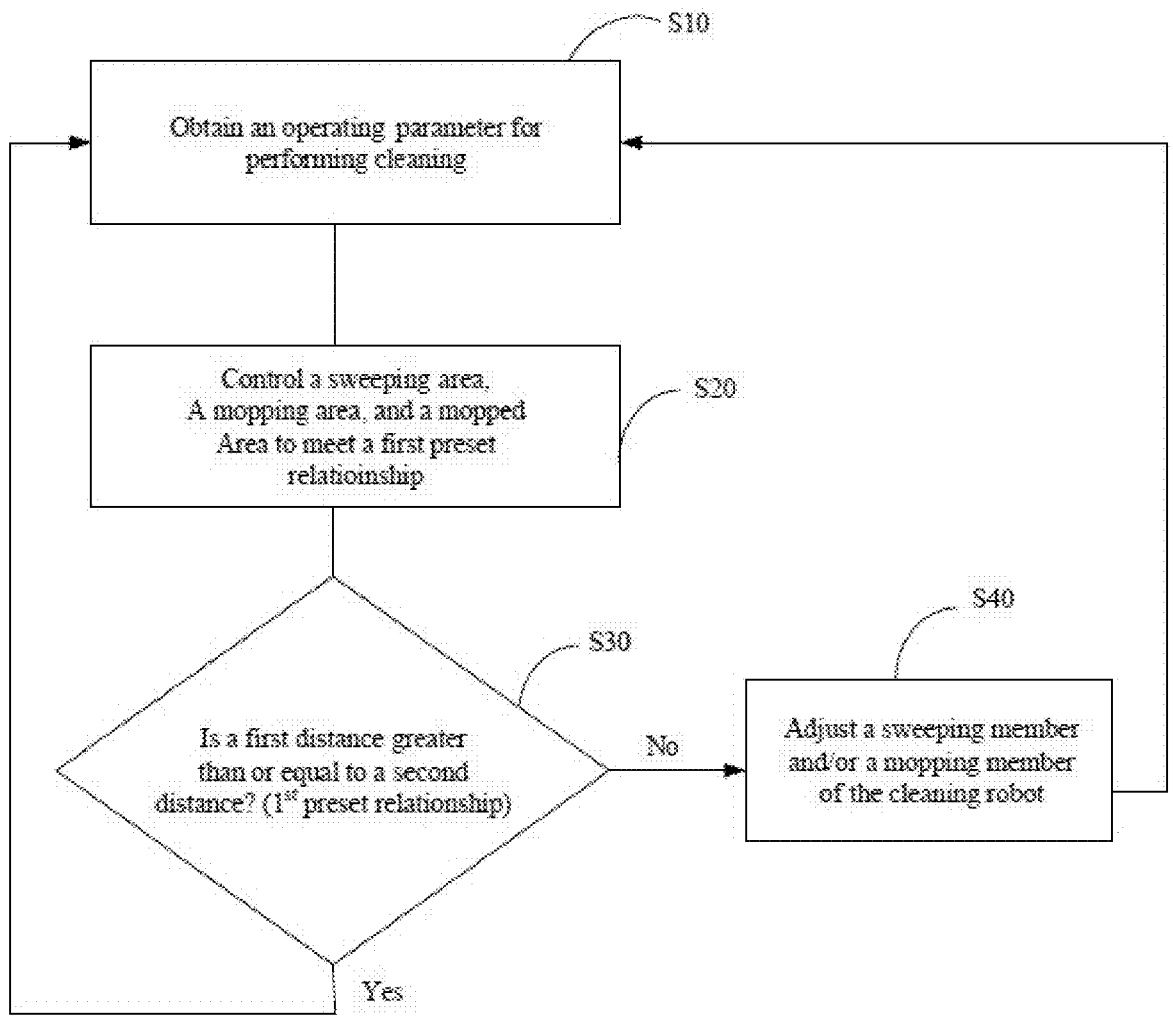
FIG. 2 is a schematic flowchart of a cleaning control method according to an embodiment of the present application.

Referring to FIG. 2, FIG. 2 is a schematic flowchart of a cleaning control method according to a first embodiment of the present application. It should be noted that, although a logical order is shown in the flowchart, in some cases, the illustrated or described operations may be performed in an order different from that described herein.

The cleaning control method of the present application is applied to a cleaning robot including a sweeping member and a mopping member. The cleaning control method of the present application includes:

operation S10, obtaining an operating parameter for the cleaning robot to clean.

It should be noted that, in this embodiment, the operating parameter includes, but is not limited to, a cleaning path of the cleaning robot; a layout, a position and an operating state of the sweeping member; a relative position relationship between the sweeping member and the mopping member, etc. The layout of the sweeping member includes a type, a quantity, a distribution position, etc. of the sweeping member. Specifically, the cleaning path may be a spiral path, a sidewinding path, or the like, or may be another path. The operating state of the sweeping member refers to whether the sweeping member works. The relative position relationship between a position of the sweeping member and a position of the mopping member may include a position relationship in a horizontal direction, a position relationship in a vertical direction, and the position relationship in the horizontal direction may include a relative position relationship perpendicular to the advancing direction of the cleaning robot, and a relative position relationship parallel to the advancing direction of the cleaning robot.

It should be understood that, based on different design requirements of actual applications, in different feasible implementations, the specific type of the operating parameter may of course include various parameters recited in the present embodiment, for example, in another feasible implementation, the operating parameter may of course be a value of suction, a number of cycles of cleaning, a cleaning duration, etc. The cleaning control method of the present application does not limit the specific type of the operating parameter.

When the cleaning robot performs a cleaning task, the cleaning robot may obtain an operating parameter for cleaning. Specifically, the operating parameter may be a default setting of the system which is stored in a memory of the cleaning robot, and read by a processor of the cleaning robot from the memory, or the operating parameter may be set by the user, for example, the user may set the cleaning path of the cleaning robot to be a spiral path, or the operating parameter may be a position of the cleaning member detected by the cleaning robot itself, for example, each of the left side and the right side of the cleaning robot is provided with a sweeping member, and the sweeping member on one side is detected to be damaged or faulty, then the cleaning path may be set to be a spiral path. Other manners may also be used to obtain the operating parameter, for example, the cleaning robot may obtains the operating parameter by interacting with an external device. The external device, for example, may be the base station which cooperates with the cleaning robot, or a user terminal, which is not limited herein.

Operation S20, when the sweeping member and the mopping member working together, controlling, according to the operating parameter, a sweeping area formed in real time by the sweeping member, a mopping area formed in real time by the mopping member and a mopped area formed on a lateral side of the cleaning robot to meet a first preset relationship.

Operation S30, determining whether the sweeping area, the mopping area and the mopped area meet the first preset relationship which includes that a first distance is greater than or equal to a second distance. A first distance is formed between a boundary of the sweeping area which is the closest to the mopped area and a boundary of the mopped area which is the closest to the sweeping area. A second distance is formed between a boundary of the mopping area which is the closest to the mopped area and a boundary of the mopped area which is the closest to the mopping area.

Operation S40, based on a determination that the first preset relationship is not met, adjusting the sweeping member and/or the mopping member of the cleaning robot, and implement Operation S10 to obtain operating parameters to control the sweeping area, the mopping area and the mopped area to meet the first preset relationship.

The sweeping member may include a side brush, and a rolling brush, and the mopping member may be a mop, a rolling mopping member, or the like. The forms or names of the sweeping member and the mopping member may be in other forms, which is not limited herein.

After the cleaning robot obtains the operating parameter, when the sweeping member and the mopping member perform the cleaning task, the sweeping member forms a sweeping coverage area in real time when the sweeping member works, and the mopping member forms a mopping coverage area in real time when the cleaning robot works. As the cleaning robot moves, the position of the sweeping member and the position of the mopping member change in real time, the sweeping coverage area moves along with the real-time movement of the cleaning robot to form the sweeping area of the sweeping member, and the mopping coverage area moves along with the real-time movement of the cleaning robot to form the mopping area of the mopping member. A mopping area, which is formed on a lateral side of the cleaning robot and located on a path traversed by the cleaning robot is taken as the mopped area of the cleaning robot.

When the cleaning robot performs cleaning and mopping, a boundary of the sweeping area formed in real time by the sweeping member, which is close to the mopped area, has a first distance from the mopped area, and the first distance may be greater than or equal to zero, or may be less than zero. The first distance being greater than or equal to zero indicates that the sweeping area does not cover the mopped area, and the first distance being less than zero indicates that the sweeping area covers the mopped area. A boundary of the mopping area close to the mopped area has a second distance from the mopped area. By controlling the first distance to be greater than or equal to the second distance, the mopping area formed in real time can mop and clean the mopped area having been contacted by the sweeping member.

According to the embodiments of the present application, when the cleaning robot performs sweeping and mopping, the sweeping area formed in real time by the sweeping member, the mopping area formed in real time by the mopping member, and the mopped area formed on the lateral side of the cleaning robot meet a first preset relationship, which effectively avoids polluting or dirtying the mopped area, wetting the sweeping member, and further improves the efficiency of the cleaning robot cleaning the ground surface. In addition, the sweeping member can also be prevented from being wetted by the mopped and wetted area, thereby avoiding that the dirt on the sweeping member pollutes the cleaned area.

Further, in a feasible embodiment, the sweeping area formed in real time by the sweeping member, the mopping area formed in real time by the mopping member and the mopped area formed on the lateral side of the cleaning robot meet a second preset relationship, and the second preset relationship includes that a third distance between a boundary of the sweeping area away from the mopped area and the mopped area is greater than or equal to a fourth distance between a boundary of the mopping area away from the mopped area and the mopped area.

In a specific implementation, in addition to the first preset relationship, the second preset relationship may also be satisfied. The boundary of the mopping area away from the mopped area has a fourth distance from the mopped area, and the third distance is controlled to be greater than or equal to the fourth distance. As such, on a side away from the mopped area, the mopping area mopped in real time by the mopping member is included in the sweeping area swept in real time by the sweeping member, which ensures that during working of the cleaning robot, on a side of the cleaning robot away from the boundary of the mopped area, the mopping area mopped in real time by the mopping component at the rear is the sweeping area that has been swept by the sweeping member in front.

Figure 6:
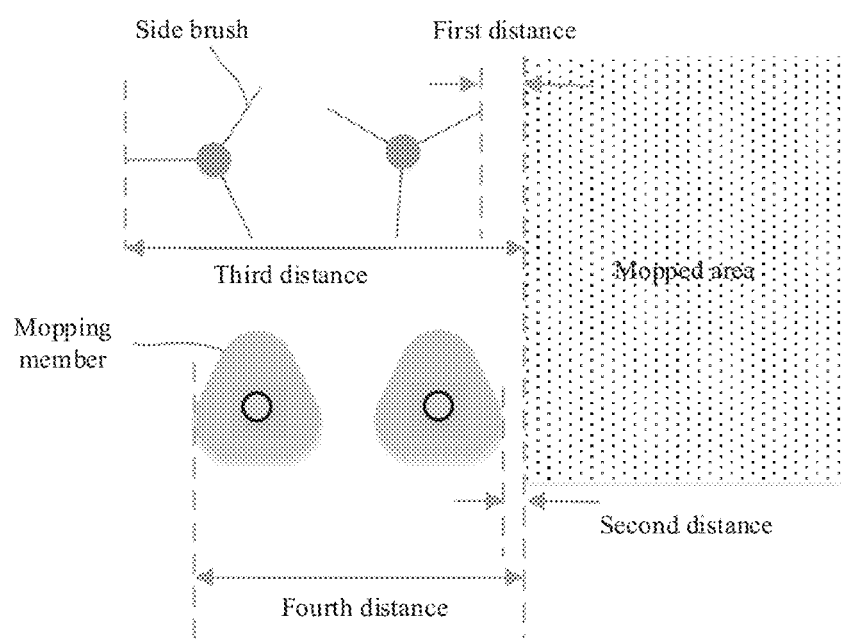
FIG. 6 is a demonstrated schematic diagram of a relationship among a sweeping area of a sweeping member, and a mopping area and a mopped area of a sweeping member according to the present application.
Figure 7:
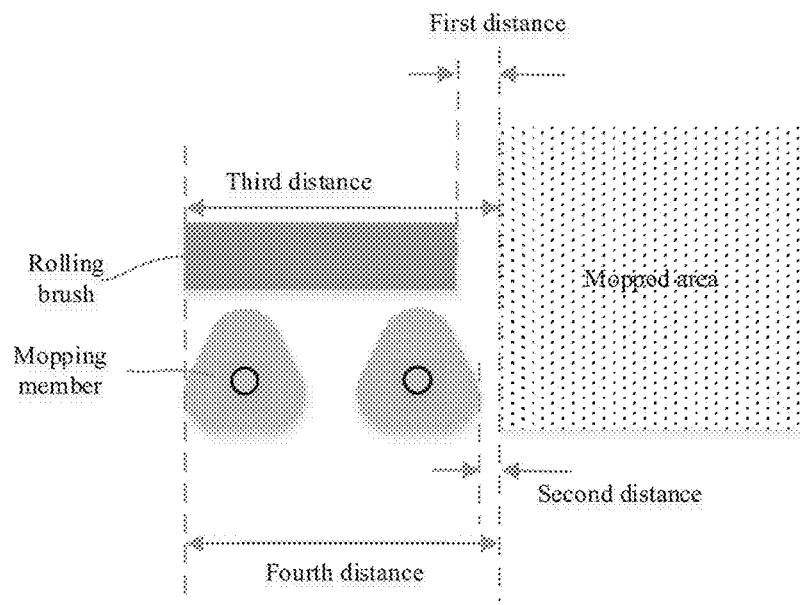
FIG. 7 is a demonstrated schematic diagram of another relationship among the sweeping area of the sweeping member, and the mopping area and the mopped area of the mopping member according to the present application.

For example, please refer to the cleaning robot shown in FIG. 3 and the relationship among the sweeping area of the side brush or the rolling brush, the mopping area of the mopping member and the mopped area shown in FIG. 6 to FIG. 7. In FIG. 6, a boundary of the sweeping area formed in a sweeping process of the side brush, which is close to the mopped area, has a first distance from the mopped area, a boundary of the mopping area close to the mopped area has a second distance from the mopped area, and the first distance is greater than the second distance. A boundary of the sweeping area of the side brush away from the mopped area has a third distance from the mopped area, a boundary of the mopping area of the mopping member away from the mopped area has a fourth distance from the mopped area, and the third distance is greater than the fourth distance. In FIG. 7, a boundary of the sweeping area formed in a sweeping process of the rolling brush, which is close to the mopped area, has a first distance from the mopped area, a boundary of the mopping area close to the mopped area has a second distance from the mopped area, and the first distance is greater than the second distance. A boundary of the sweeping area of the rolling brush away from the mopped area has a third distance from the mopped area, a boundary of the mopping area of the mopping member away from the mopped area has a fourth distance from the mopped area, and the third distance is equal to the fourth distance. An area between a boundary of the sweeping area of the sweeping member close to a side of the mopped area and the mopped area is a swept area of the sweeping member, thus, it can ensure that the area mopped by the mopping member has already been swept before.

For example, by controlling the side brush to move relative to a chassis of the cleaning robot, a third distance between the boundary of the sweeping area of the side brush away from the mopped area and the mopped area can be adjusted to make the third distance be greater than or equal to the fourth distance.

For another example, by controlling the rolling brush to move relative to the chassis of the cleaning robot, a third distance between the boundary of the sweeping area of the rolling brush away from the mopped area and the mopped area can be adjusted to make the third distance be greater than or equal to the fourth distance.

For still another example, by controlling the side brush and the rolling brush to move relative to the chassis of the cleaning robot, a third distance between the boundary of the sweeping area away from the mopped area and the mopping area can be adjusted to make the third distance be greater than or equal to the fourth distance, and the sweeping area is formed by the side brush and the rolling brush together.

Further, in a feasible embodiment,
the cleaning control method further includes:
controlling the first distance to be greater than or equal to zero, to prevent the sweeping area from touching the mopped area; and/or
controlling the second distance to be less than or equal to zero, to make the mopping area adjacent to or cover the mopped area.

Figure 8:
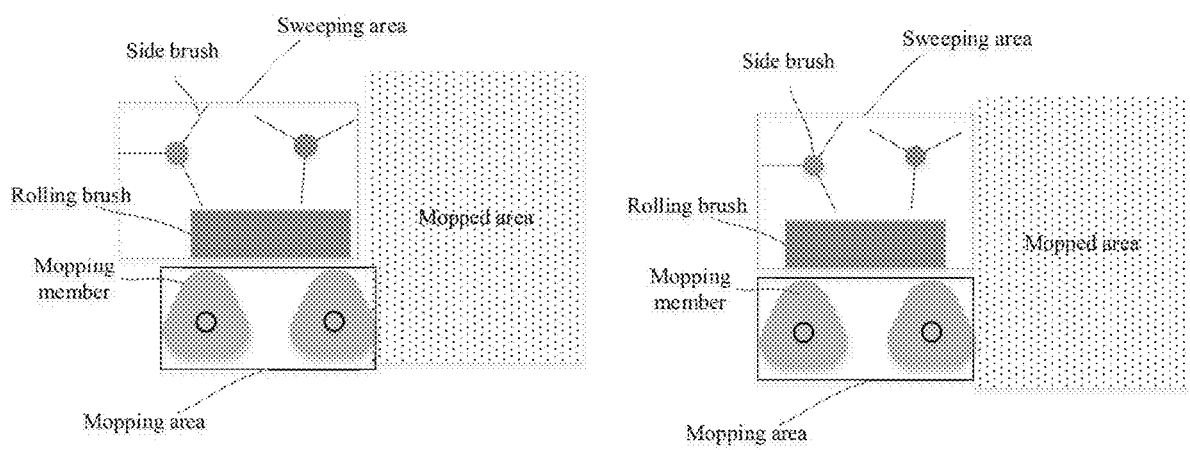
FIG. 8 is a demonstrated schematic diagram of still another relationship among the sweeping area of the sweeping member, and the mopping area and the mopped area of the mopping member according to the present application.

In a specific implementation, when the first distance is greater than zero, as shown in the left part of FIG. 8, there is a gap between the sweeping area and the mopped area. When the first distance is zero, as shown in the right part of FIG. 8, the sweeping area is adjacent to the mopped area. By controlling the first distance to be greater than or equal to zero, the sweeping area can be prevented from touching the mopped area, thus the sweeping area, the mopping area and the mopped area can meet the first preset condition.

In a specific implementation, when the second distance is less than zero, as shown in the left part of FIG. 8, the mopping area covers the mopped area. When the second distance is equal to zero, as shown in the right part of FIG. 8, the mopping area is adjacent to the mopped area. The second distance being less than or equal to zero can make the mopping area adjacent to or cover the mopped area, thus the sweeping area, the mopping area and the mopped area can meet the first preset condition.

Further, a second embodiment of the cleaning control method of the present application is provided based on the first embodiment of the cleaning control method of the present application. In operation S20, "controlling the sweeping area formed in real time by the sweeping member according to the operating parameter, the mopping area formed in real time by the mopping member and the mopped area formed on the lateral side of the cleaning robot to meet the first preset relationship" may include the following operations:
operation S201, controlling a position or an operating state of the mopping member to make the mopping area of the mopping member close to the mopped area; and/or
controlling a position or an operating state of the sweeping member to make the sweeping area of the sweeping member stay away from the mopped area.

The operating state of the sweeping member includes a working state and a non-working state.

In implementations, the position or the operating state of the mopping member may be controlled, so that the mopping area of the mopping member is close to the mopped area, and the sweeping area, the mopping area and the mopped area can meet the first preset condition.

In implementations, the position or the operating state of the sweeping member may also be controlled, so that the sweeping area of the sweeping member is away from the mopped area, and the sweeping area, the mopping area and the mopped area can meet the first preset condition.

In implementations, the positions or the operating states of the mopping member and the sweeping member can be controlled, so that the mopping area of the mopping member is close to the mopped area, the sweeping area of the sweeping member is away from the mopped area, and the sweeping area, the mopping area and the mopped area can meet the first preset condition.

Further, based on the first embodiment and the second embodiment of the cleaning control method of the present application, in a feasible embodiment, the operating parameter obtained by the cleaning robot is the position of the sweeping member, and the position of the sweeping member is on at least one of the left side and the right side of the cleaning robot. In operation S20, "controlling, according to the operating parameter, the sweeping area formed in real time by the sweeping member, the mopping area formed in real time by the mopping member and the mopped area formed on the lateral side of the cleaning robot to meet the first preset relationship" may further include:
operation S202, controlling a target sweeping member close to the mopped area to not work, be in a designated area, or be lifted;
wherein a sweeping area of the target sweeping member is exceeded beyond or is aligned with a target boundary extension line of the mopping area, the target boundary extension line is a boundary extension line parallel to an advancing direction of the cleaning robot.

Figure 9:
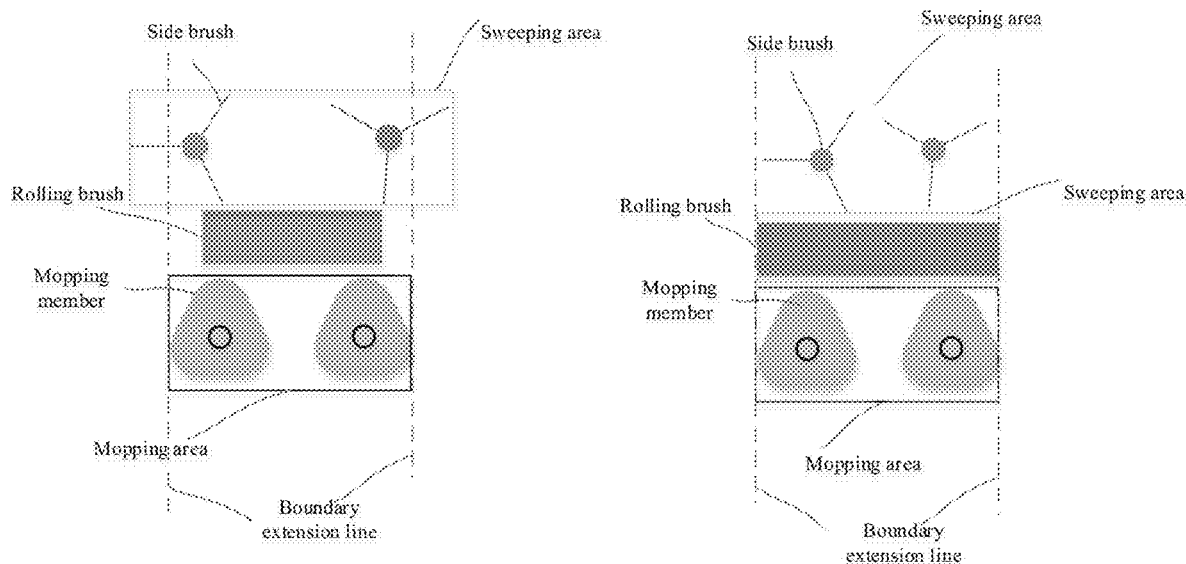
FIG. 9 is a demonstrated schematic diagram of a relationship between a sweeping area and a boundary extension line of a target sweeping member according to the present application.

For example, as shown in the left part of FIG. 9, the sweeping member of the cleaning robot includes two side brushes and a rolling brush, and the two side brushes are the target sweeping members, and the sweeping area of the target sweeping members is exceeded beyond a boundary extension line which is located on one side of the mopping area and parallel to the advancing direction of the cleaning robot. As shown in the right part of FIG. 9, the sweeping member of the cleaning robot includes two side brushes and a rolling brush, and the rolling brush is the target sweeping member. The sweeping area associated with the target sweeping member is aligned with a boundary extension line which is located on one side of the mopping area and parallel to the advancing direction of the cleaning robot.

Generally, the sweeping member of the cleaning robot may include unlimited number of side brushes and rolling brushes. In this embodiment, the sweeping member, whose sweeping area is extended beyond or aligned with the boundary extension line which is located on one side of the mopping area and parallel to the advancing direction of the cleaning robot, is taken as the target sweeping member. For example, as shown in FIG. 9, the cleaning robot in the left part of FIG. 9 includes two side brushes and one rolling brush, and the two side brushes are the target sweeping members. The cleaning robot in the right part of FIG. 9 includes two side brushes and one rolling brush, and the rolling brush is the target sweeping member. It can be understood that in another layout of the cleaning robot, the target sweeping member may be a rolling brush, or be a side brush and a rolling brush, which is not limited in the present application.

Further, the target sweeping member close to the mopped area can be controlled to not work, be located in a designated area, or be lifted.

The cleaning robot can obtain the operating states of the sweeping members on the left side and the right side of the cleaning robot at the current moment, and based on the operating states of sweeping members, so as to control the sweeping member close to the mopped area by taking at least one way of stopping working, being in a designated area and being lifted. Specifically, the sweeping member close to the mopped area may be controlled to not work, for example, when the sweeping member on the left side of the cleaning robot comes close to the mopped area, the sweeping member on the left side is switched to a non-working state, and when the sweeping member on the right side comes close to the mopped area, the sweeping member on the right side is switched to a non-working state.

By controlling the sweeping member close to the mopped area to not work, the sweeping member that does not work will not rotate rapidly to pollute the mopped area.

Figure 9A:
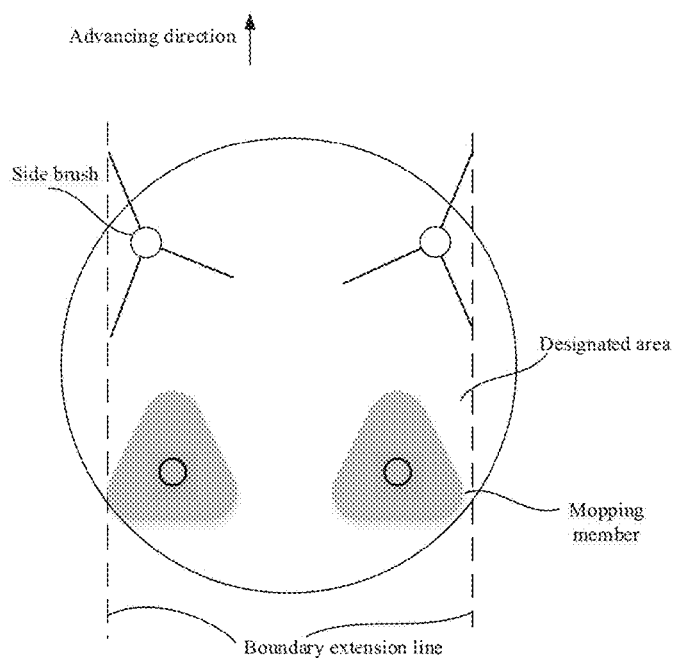
FIG. 9A is a demonstrated schematic diagram of a designated area according to the present application.

The designated area refers to an area meeting the following conditions: when the sweeping member is limited in the designated area, in a direction perpendicular to the advancing direction, a dimension of the sweeping area formed in real time by the sweeping member exceeding the mopping area formed in real time by the mopping member being decreased; or in a direction perpendicular to the advancing direction, a dimension of the sweeping area formed in real time by the sweeping member being less than a dimension the mopping area formed in real time by the mopping member. As shown in FIG. 9A, the designated area can be set to be the area of the mopping area which falls between the boundary extension lines in the advancing direction of the cleaning robot. The sweeping member can be limited in the designated area, because the sweeping member is in front of the mopping member in the advancing direction, the sweeping area of the sweeping member can be covered by the mopping area of the mopping member when the cleaning robot moves forward, so that the mopped area will not getting dirty again.

Figure 9B:
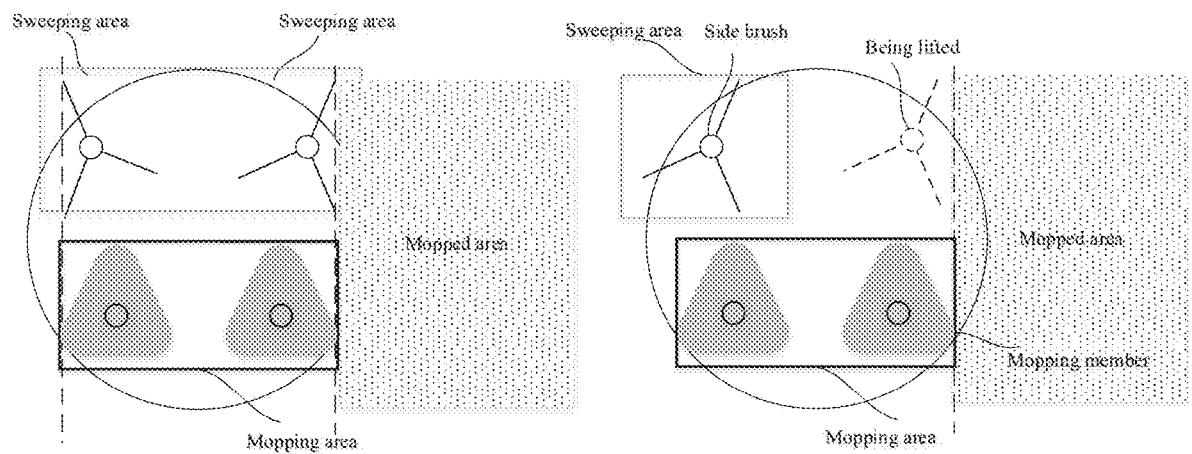
FIG. 9B is a demonstrated schematic diagram of lifting a sweeping member which is close to a mopped area according to an embodiment of the present application.

As shown in FIG. 9B, the sweeping member close to the mopped area may be lifted to be separated from the ground surface, which makes the sweeping area of the sweeping member become smaller, so that in the direction perpendicular to the advancing direction, a dimension of the sweeping area formed in real time by the sweeping member exceeding the mopping area formed in real time by the mopping member becomes smaller.

Specifically, controlling the target sweeping member close to the mopped area to be limited in the designated area can be realized by controlling the target sweeping member close to the mopped area to translate, and controlling the target sweeping member to move in the direction away from the mopped area.

When the sweeping member is a side brush, controlling the sweeping member which is close to the mopped area to be limited in the designated area can be controlling brush bristles of the side brush to rotate to a designated area of a rotating space of the brush bristles. In an implementation, when the brush bristles are detected to be rotated to other areas different from the designated area, the side brush can be controlled to rotate to the designated area, so that the situation when the brush bristles rotate to a non-designated area, the mopping member cannot clean the sweeping area of the side brush is avoided. Alternatively, the side brush or the brush bristles can be controlled to move to the designated area, specifically, the sweeping member close to the mopped area can be moved, floated, or swung in a direction away from the mopped area.

In a specific implementation, when the cleaning robot turns back during cleaning, the cleaning robot can control the sweeping member close to the mopped area to not work, or be limited in the designated area, or be lifted.

When the cleaning robot cleans along a sidewinding path, the cleaning robot makes u-turns many times, the left sweeping member close to the mopped area and the right sweeping member close to the mopped area will alternately appear, thus, the cleaning robot may switch the left sweeping member and the right sweeping member to not work alternately and switch the sweeping member away from the mopped area to a working state, or control the sweeping member close to the mopped area to be limited in the designated area alternately, or be lifted alternately.

By lifting the sweeping member close to the mopped area, the lifted sweeping member does not contact the mopped area, or the portion of the mopped area, which has been contacted by the sweeping member, will be cleaned by the mopping member, so as to avoid the mopping area getting dirty again.

It should be noted that, in this embodiment, the cleaning path of the cleaning robot during cleaning includes, but is not limited to, the sidewinding path and the spiral path.

In the process of moving according to any sidewinding path or any spiral path, the target sweeping member close to the mopped area may be controlled to not work, or be limited in the designated area, or be lifted, so as to avoid the mopping area getting dirty again by the sweeping area of the sweeping member.

Further, in a feasible embodiment, target sweeping members are distributed on the left side and the right side of the cleaning robot. Operation S202 may include:

operation S2021, in response to that the cleaning robot cleans along a sidewinding path, controlling one of target sweeping members on the left side and the right side of the cleaning robot, which is close to the mopped area, to not work, be in a designated area, or be lifted.

The cleaning path of the cleaning robot is a sidewinding path, the cleaning robot makes u-turns multiple times when cleans along the sidewinding path, the sweeping member on the left side of the cleaning robot and the sweeping member on the right side are alternately close to the mopped area, therefore, the target sweeping member close to the mopped area may be controlled to not work, be limited in a designated area, or be lifted.

Figure 5:
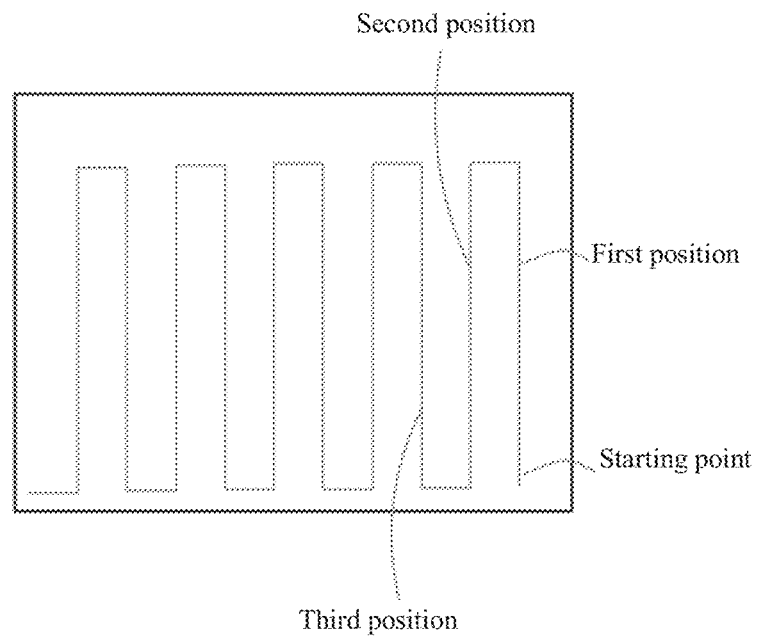
FIG. 5 is a demonstrated schematic diagram showing that the cleaning robot cleans according to a sidewinding path according to the present application.

The sweeping member included by the cleaning robot includes a side brush, and may further include a rolling brush. The side brush is a target sweeping member. As shown in FIG. 5, when the cleaning robot cleans along a sidewinding path, the cleaning robot makes u-turns multiple times and passes through a first position, a second position and a third position successively. At the second position, the target sweeping member on the left side is close to the mopped area, and at the third position, the target sweeping member on the right side is close to the mopped area. The situation that the target sweeping member on the left side and the target sweeping member on the right side are close to the mopped area alternately will appear. Thus, the cleaning robot can control the target sweeping member close to the mopped area to not work, or be limited in a designated area, or be lifted. Thus the target sweeping members on the left side and the right side will not work alternately, be limited in the designated area alternately or be lifted alternately, so as to avoid the mopping area getting dirty again by the sweeping area of the sweeping member.

Further, in a feasible embodiment, the target sweeping members are distributed on the left side and the right side of the cleaning robot, and the above operation S202 may include:

operation S2022, in response to that the cleaning robot cleans along a spiral path, controlling the target sweeping member, which is close to the mopped area, to not work, be kept in the designated area, or be lifted continuously.

The spiral path may have a shape of nested hollow square coils, or a shape liking a mosquito-repellent incense coil, or may be another shape, such as a regular spiral path or an irregular spiral path, which is not limited herein.

Specifically, the cleaning path of the cleaning robot is a spiral path. When the cleaning robot cleans along the spiral path, the sweeping member on one side of the cleaning robot is continuously close to the mopped area, thus the target sweeping member close to the mopped area can be controlled to not work continuously, or be limited in the designated area continuously, or be lifted continuously.

Figure 10:
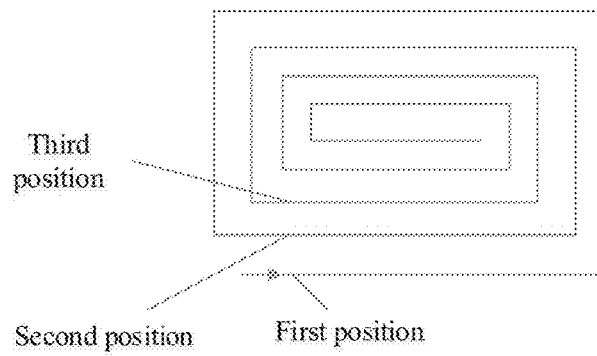
FIG. 10 is a demonstrated schematic diagram showing that the cleaning robot cleans according to a spiral path according to the present application.

When the cleaning robot cleans along the spiral path, the sweeping member on one side of the cleaning robot is close to the mopped area all the time. For example, as shown in FIG. 10, the sweeping member on the right side is close to the mopped area all the time, or the sweeping member on the left side is close to the mopped area all the time. Therefore, the cleaning robot can control the target sweeping member close to the mopped area to not work continuously, or be limited in the designated area continuously, or be lifted continuously. In this way, the sweeping member on one side will continue the state of not working, being limited in the designated area or be lifted, so as to avoid the ground getting dirty again due to that the sweeping member close to the mopped area contacts the wet ground.

Further, in a feasible embodiment, the target sweeping members included in the cleaning robot include a side brush arranged on the left side of the cleaning robot, and a side brush arranged on the right side of the cleaning robot. Optionally, the cleaning robot may further include other sweeping members other than the target sweeping members, for example, a rolling brush. Operation S202 may include:

operation S2023, determining a first side brush close to the mopped area.

In the process of the cleaning robot controlling the sweeping member and the mopping member to clean, a first side brush, which is close to the mopped area, is determined among the side brushes on the left side and the right side of the cleaning robot.

Operation S2024, adjusting an operating state of the first side brush to be a non-working state, or limiting the first side brush in a designated area, or lifting the first side brush.

After detecting the first side brush close to the mopping area and further detecting that the first side brush is at the working state, the cleaning robot immediately adjusts the operating state of the first side brush from the working state to the non-working state, or controls the first side brush to be limited in the designated area, or controls the first side brush to not work and being lifted. In this way, the cleaning robot can only control a second side brush which is still in the working state and the mopping member to clean the ground.

Specifically, for example, the cleaning robot is provided with a side brush on the left side and a side brush on the right side, and the cleaning robot can clean along a sidewinding path. After the cleaning robot turns around, the first side brush close to the mopped area is detected to be the side brush on the left side, and then the operating state of the first side brush is controlled to be the non-working state, or the first side brush is controlled to be limited in the designated area, or the first side brush is controlled to be lifted. After the cleaning robot turns around again, the first side brush close to the mopped area is detected to be the side brush on the right side, and then the operating state of the first side brush is controlled to be the non-working state, or the first side brush is controlled to be limited in the designated area, or the first side brush is controlled to be lifted. In this way, the side brush on the left side and the side brush on the right side can be alternately controlled to realize that the sweeping area formed in real time by the sweeping member, the mopping area formed in real time by the mopping member and the mopped area formed on the lateral side of the cleaning robot meet the first preset relationship, and so as to avoid the mopping area getting dirty again.

Further, based on the first embodiment of the cleaning control method of the present application, in a feasible embodiment, the operating parameter obtained by the cleaning robot is: a relative position relationship between the sweeping member and the mopping member. In the above operation S20, the operation "controlling, according to the operating parameter, the sweeping area formed in real time by the sweeping member, the mopping area formed in real time by the mopping member and the mopped area formed on the lateral side of the cleaning robot to meet the first preset relationship" may include:

operation 203: during a cleaning process, controlling the sweeping member and/or the mopping member to perform at least one of the following adjustments: translation, floating, swinging and lifting, to make the sweeping area of the sweeping member and/or the mopping area of the mopping member change in a direction perpendicular to the advancing direction of the cleaning robot.

In implementations, at least one of the sweeping member and the mopping member may be controlled to translate in the horizontal direction, such that the sweeping area of the sweeping member and/or the mopping area of the mopping member changes in a direction perpendicular to the advancing direction of the cleaning robot. There may be an area change or an area displacement change, so that the sweeping area, the mopping area and the mopped area can meet the first preset condition.

In implementations, at least one of the sweeping member and the mopping member may be controlled to float or swing, so that the sweeping area of the sweeping member and/or the mopping area of the mopping member are changed in a direction perpendicular to the advancing direction of the cleaning robot, and the sweeping area, the mopping area and the mopped area may meet the first preset condition.

In implementations, at least one of the sweeping member and the mopping member may be controlled to be lifted in a direction perpendicular to a cleaning surface, so that the sweeping area of the sweeping member and/or the mopping area of the mopping member are changed in a direction perpendicular to the advancing direction of the cleaning robot, and the sweeping area, the mopping area and the mopped area may meet the first preset condition.

Further, in a feasible embodiment, when the cleaning robot cleans along a sidewinding path, the cleaning robot may alternately control the sweeping members close to the mopped area to be away from the mopped area.

In an implementation, when the cleaning robot turns around multiple times when cleaning along the sidewinding path, the sweeping member on the left side of the cleaning robot and the sweeping member on the right side of the cleaning robot are close to the mopped area alternately, thus, the sweeping member close to the mopped area can be controlled to be away from the mopped area, and the sweeping member on the left side and the sweeping member on the right side are moved away from the mopped area alternately. Therefore, the sweeping area, the mopping area and the mopped area can meet the first preset condition, and the sweeping area of the sweeping member can be prevented from causing the mopped area getting dirty again.

Further, based on the first embodiment of the cleaning control method of the present application, in a feasible embodiment, the operating parameter obtained by the cleaning robot is a relative position relationship between the sweeping member and the mopping member. In the above operation S20, the operation "controlling, according to the operating parameter, a sweeping area formed in real time by the sweeping member, a mopping area formed in real time by the mopping member and a mopped area formed on the lateral side of the cleaning robot to meet the first preset relationship" may include:

operation S204, adjusting a relative position relationship between a target sweeping member and the mopping member, where the sweeping area of the target sweeping member is extended beyond or is aligned with a target boundary extension line of the mopping area, and the target boundary extension line is a boundary extension line parallel to the advancing direction of the cleaning robot; and operation S205, controlling the target sweeping member and the mopping member to clean after the relative position relationship is adjusted, where the sweeping area formed in real time by the sweeping member after the relative position relationship is adjusted, the mopping area formed in real time by the mopping member after the relative position relationship is adjusted and the mopped area formed on the lateral side of the cleaning robot meet the first preset relationship.

The relative position relationship between the target sweeping member and the mopping member may include a position relationship in a horizontal direction, a position relationship in a vertical direction, and the position relationship in the horizontal direction may, include a relative position relationship perpendicular to the advancing direction of the cleaning robot, and a relative position relationship parallel to the advancing direction of the cleaning robot.

When the operating parameter obtained by the cleaning robot is the relative position relationship between the sweeping member and the mopping member, the cleaning robot further adjusts the relative position relationship. Then, the cleaning robot cleans through the sweeping member and the mopping member after the relative position relationship is adjusted, so that after the relative position relationship is adjusted, when the sweeping member and the mopping member work, the sweeping area formed in real time by the sweeping member in the cleaning process, and the mopping area of the mopping member and the mopped area meet the first preset relationship.

Figure 11:
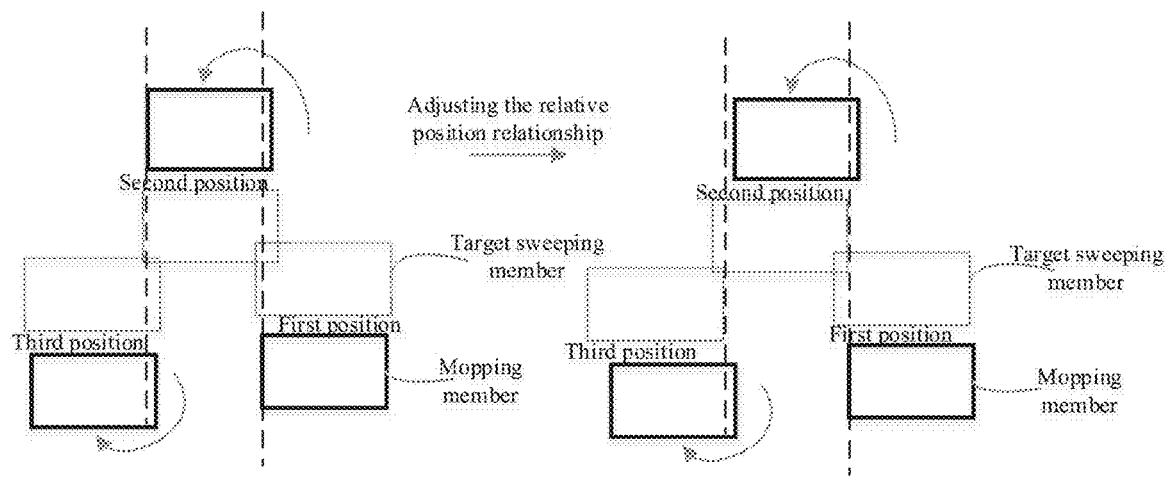
FIG. 11 is a demonstrated schematic diagram of before and after adjustment of a relative position relationship between a position of the sweeping member and a position of the mopping member according to an embodiment of the present disclosure.

Referring to the application scenario shown in FIG. 11, after the cleaning robot detects in real time the arrangement of the sweeping member and the mopping member on the cleaning robot, and obtains the relative position relationship between the sweeping member and the mopping member as shown in the left part of FIG. 11 accordingly, the cleaning robot controls the sweeping member and/or the mopping member to move, float or swing in a direction perpendicular to the advancing direction of the cleaning robot, so as to adjust the relative position relationship between the sweeping member and the mopping member, and obtain the adjusted relative position relationship between the sweeping member and the mopping member as shown in the right part of FIG. 11. In this way, when the cleaning robot cleans the ground through the sweeping member and the mopping member with the adjusted relative position relationship, the sweeping area formed by the sweeping member when cleaning the ground, and the mopping area of the mopping member and the mopped area meet the first preset relationship, so as to avoid the mopping area getting dirty again.

Further, in a feasible embodiment, in operation S204, the "adjusting the relative position relationship between the target sweeping member and the mopping member" may include:

operation S2041, controlling the mopping area of the mopping member to be close to the mopped area; and/or operation S2042, controlling the sweeping area of the target sweeping member to be away from the mopped area.

After acquiring the relative position relationship between the sweeping member and the mopping member, the cleaning robot may control the mopping area of the mopping member to be close to the mopped area, so that the sweeping area, the mopping area and the mopped area can meet the first preset condition, and so as to avoid the mopping area getting dirty again by the sweeping area of the sweeping member.

The sweeping area of the target sweeping member can be controlled to be away from the mopped area, so that the sweeping area, the mopping area and the mopped area can meet the first preset condition, and so as to avoid the mopping area getting dirty again by the sweeping area of the sweeping member.

Specifically, the position of the mopping member and/or the position of the target sweeping member can be adjusted. For example, in a direction perpendicular to the advancing direction, the position of the target sweeping member and/or the position of the mopping member can be adjusted until the mopping area of the mopping member is close to the mopped area, and/or the sweeping area of the sweeping member is away from the mopped area after the position of the sweeping member and/or the position of the mopping member is adjusted.

Figure 12:
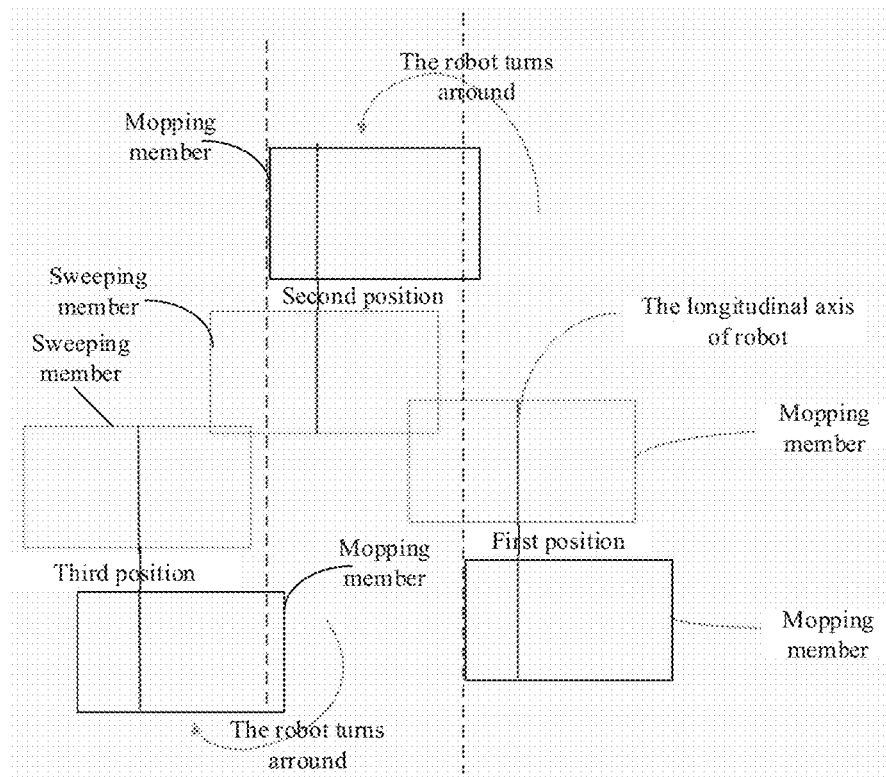
FIG. 12 is a demonstrated schematic diagram of adjusting a position of the mopping member according to an embodiment of the present disclosure.

For example, please refer to the application scenario shown in FIG. 12. After the cleaning robot obtains the relative position relationship between the sweeping member and the mopping member, the cleaning robot determines the advancing direction of the cleaning robot during cleaning, and then controls the mopping area of the mopping member to be close to the mopped area in the direction perpendicular to the advancing direction, so that the sweeping area, the mopping area and the mopped area can meet the first preset condition, and so as to avoid the mopping area getting dirty again by the sweeping area of the target sweeping member.

Alternatively, the cleaning robot obtains the relative position relationship between the sweeping member and the mopping member and determines the advancing direction of the cleaning robot during cleaning, and may control the sweeping area of the target sweeping member to be away from the mopped area in the direction perpendicular to the advancing direction, so that the sweeping area, the mopping area and the mopped area may meet the first preset condition, and so as to avoid the mopping area getting dirty again by the sweeping area of the target sweeping member.

Alternatively, the cleaning robot obtains the relative position relationship between the sweeping member and the mopping member and determines the advancing direction of the cleaning robot during cleaning, and may control the mopping area of the mopping member to be close to the mopped area and the sweeping area of the target sweeping member to be away from the mopped area in the direction perpendicular to the advancing direction, so that the sweeping area, the mopping area and the mopped area can meet the first preset condition, and so as to avoid the mopping area getting dirty again by the sweeping area of the target sweeping member.

Further, in this embodiment, in operation S204, the operation of "adjusting the relative position relationship between the target sweeping member and the mopping member" may include:

controlling the target sweeping member and/or the mopping member to perform at least one of the following adjustments: translation, floating, swinging and lifting, to make the sweeping area of the sweeping member and/or the mopping area of the mopping member change in a direction perpendicular to the advancing direction of the cleaning robot.

In implementations, at least one of the target sweeping member and the mopping member may be controlled to translate, so that the sweeping area of the sweeping member and/or the mopping area of the mopping member change in the direction perpendicular to the advancing direction of the cleaning robot, and the sweeping area, the mopping area and the mopped area may meet the first preset condition.

In implementations, at least one of the target sweeping member and the mopping member may be controlled to float or swing, so that the sweeping area of the sweeping member and/or the mopping area of the mopping member change in the direction perpendicular to the advancing direction of the cleaning robot, and the sweeping area, the mopping area and the mopped area may meet the first preset condition.

In implementations, at least one of the target sweeping member and the mopping member may be controlled to be lifted in a direction perpendicular to the cleaning surface, so that the sweeping area of the sweeping member and/or the mopping area of the mopping member change in the direction perpendicular to the advancing direction of the cleaning robot, and the sweeping area, the mopping area and the mopped area may meet the first preset condition.

When the cleaning robot adjusts the position of the mopping member, the cleaning robot can adjust the positions of more than two mopping members or the target sweeping member as a whole if more than two mopping members are arranged in the cleaning robot, or the cleaning robot can carry out position adjustment for a single mopping member or a single target sweeping member.

In this embodiment, after the cleaning robot is powered on and acquires that the operating parameter for cleaning the ground is the relative position relationship between the sweeping member and the mopping member, the cleaning robot determines that a straight line parallel to a longitudinal axis of the cleaning robot in real time is the current advancing direction of cleaning the ground, and then the cleaning robot adjusts the position of the sweeping member and/or the position of the mopping member in the direction perpendicular to the advancing direction, until the sweeping area formed by the sweeping member sweeping the ground is not overlapped with the mopped area formed by the mopping member mopping the ground after the position of the sweeping member and/or the position of the mopping member are adjusted.

Then, the cleaning robot controls the sweeping member and/or the mopping member after the relative position relationship is adjusted to clean the ground. Based on the adjustment of the relative position relationship, after the relative position relationship is adjusted, the sweeping area formed by the sweeping member sweeping the ground is not overlapped with the mopped area formed by the mopping member mopping the ground. In this way, the sweeping member is effectively prevented from being brought into contact with the already wetted mopped area, and polluting the ground again.

Further, in a feasible embodiment, when the cleaning robot cleans along a sidewinding path, the cleaning robot may alternately control one of the sweeping members which is close to the mopped area away from the mopped area.

In a specific implementation, the cleaning robot turns around multiple times when cleans along a sidewinding path, the sweeping member on the left side of the cleaning robot and the sweeping member on the right side are alternately close to the mopped area, thus the target sweeping member close to the mopped area can be alternately controlled to be away from the mopping area. Therefore, the target sweeping member on the left side and the target sweeping member on the right side will be away from the mopped area alternately. In this way, the sweeping area, the mopping area and the mopped area can meet the first preset condition, and so as to avoid the mopping area getting dirty again by the sweeping areas of the target sweeping members.

Further, a second embodiment of the cleaning control method of the present application is provided based on the first embodiment of the cleaning control method of the present application. In this embodiment, the operating parameter obtained by the cleaning robot is a spiral path. One side of the cleaning robot is provided with a target sweeping member, and the target sweeping member has a sweeping area exceeding or aligned with a target boundary extension line of the mopping area. The target boundary extension line is a boundary extension line parallel to the advancing direction of the cleaning robot. In the above operation S20, "controlling, according to the operating parameter, the sweeping area formed in real time by the sweeping member, the mopping area formed in real time by the mopping member and the mopped area formed on the lateral side of the cleaning robot to meet the first preset relationship" may include:

operation S206, controlling the cleaning robot to clean along the spiral path, the sweeping area formed in real time by the sweeping member which performs a sweeping task, and the mopping area formed in real time by the mopping member and the mopped area formed on the lateral side of the cleaning robot meeting the first preset relationship.

Specifically, the spiral path may be a clockwise spiral path or a counterclockwise spiral path. When the cleaning robot cleans along the spiral path, the cleaning robot can cleans along the spiral path from inside to outside or from outside to inside.

When the cleaning robot cleans along the spiral path, the cleaning robot travels from an outer circle to an inner circle, or the cleaning robot travels from the inner circle to the outer circle. The sweeping member located on one side of the cleaning robot does not cover the mopped area currently formed around the cleaning robot. In this way, the sweeping area formed in real time by the sweeping member in the cleaning process, the mopping area and the mopped area meeting the first preset relationship can be achieved, to prevent the sweeping member touching the mopped area and making the mopped area dirty again, and also to prevent the sweeping member from getting wet by touching the mopped area.

In a possible embodiment, the cleaning robot performs a cleaning task along a sidewinding path, if it is detected that the target sweeping member on one side of the cleaning robot is faulty or damaged, the cleaning robot can switch to a spiral path, and performs the cleaning task along the spiral path.

Further, in a feasible embodiment, the target sweeping member is only provided on the left side of the cleaning robot, or only the target sweeping member located on the left side of the cleaning robot is in a working state, the above operation S206 may include:

operation S2061, controlling the cleaning robot to clean along the spiral path from outside to inside in a counterclockwise direction.

Only the target sweeping member located on the left side of the cleaning robot is in the working state, which may include the following situations: the cleaning robot switches the target sweeping member on the left side to the working state, or switches the target sweeping member on the right side to the non-working state, or the cleaning robot detects that the target sweeping member on the right side is damaged or faulty. There may be other situations where the sweeping member on the left side is in the working state, and details are not provided herein.

Figure 13:
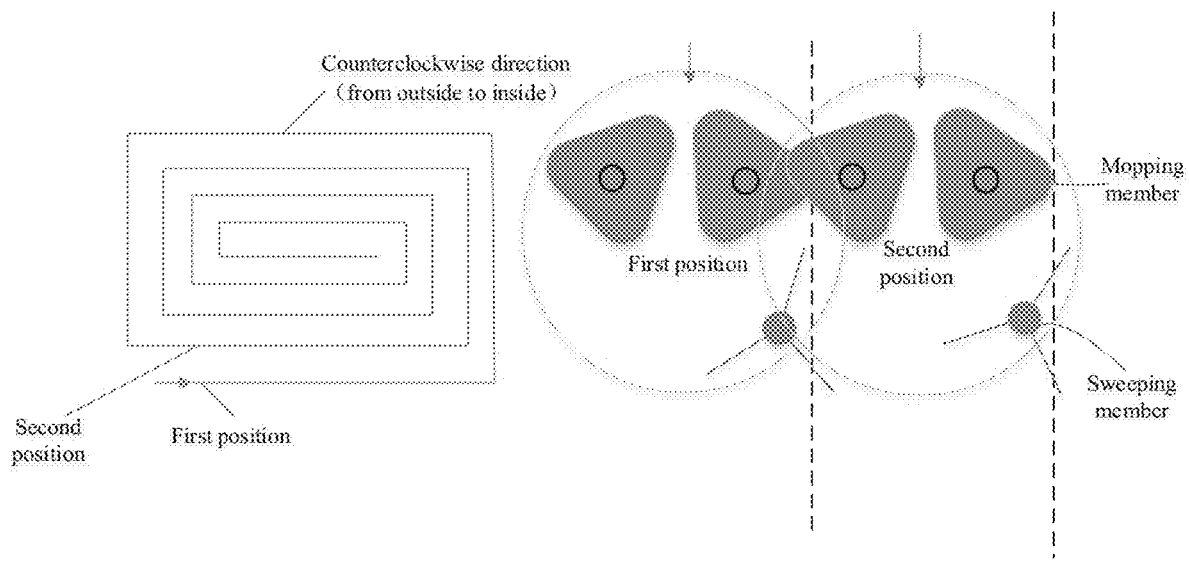
FIG. 13 is a demonstrated schematic diagram showing that the cleaning robot cleans along a spiral path from outside to inside in a counterclockwise direction according to an embodiment of the present application.

As shown in FIG. 13, the cleaning robot cleans along the spiral path from outside to inside in a counterclockwise direction, and sequentially passes through a first position and a second position. When the cleaning robot passes through the second position, the sweeping area of the sweeping member on the left side does not cover the current mopped area around the cleaning robot, and particularly does not cover the mopped area formed at the first position by the mopping member.

In general, the cleaning robot passes through the second position, according to the cleaning path set by the cleaning robot, the mopping area formed at the second position is overlapped with the mopped area formed at the first position, to missing that an area that has not been mopped. On this basis, the cleaning robot is controlled to clean along the spiral path from outside to inside in the counterclockwise direction, so that the sweeping area of the sweeping member on the left side will not cover the current mopped area around the cleaning robot, to prevent the sweeping member touching the mopped area and making the mopped area dirty again, and also to prevent the sweeping member from getting wet by touching the mopped area.

In a feasible embodiment, there are one or more sweeping members arranged on the cleaning robot, and the target sweeping member is located on the left side of the cleaning robot. The cleaning robot is controlled to clean along the spiral path from outside to inside in the counterclockwise direction.

In a specific implementation, the cleaning robot is provided with a side brush, and the side brush is arranged on the left side of the cleaning robot. The cleaning robot can be controlled to clean along the spiral path from outside to inside in the counterclockwise direction, and the side brush does not cause the current mopped area around the cleaning robot getting dirty again.

Alternatively, in a feasible embodiment, the cleaning robot has more than two sweeping members, and the target sweeping members are distributed on the left side and the right side of the cleaning robot. The cleaning robot can switch the sweeping member on the left side to the working state, or switch the sweeping member on the right side to the non-working state, or the cleaning robot detects that the sweeping member on the right side is damaged or faulty, thus, the cleaning robot is controlled to clean along the spiral path from outside to inside in the counterclockwise direction.

In a specific implementation, the left side and the right side of the cleaning robot are provided with side brushes. The cleaning robot can switch the side brush on the left side to the working state, or switch the side brush on the right side to the non-working state, or the cleaning robot detects that the sweeping member on the right side is damaged or faulty, thus the cleaning robot is controlled to clean along the spiral path from outside to inside in the counterclockwise direction, and the side brush does not cause the current mopped area around the cleaning robot getting dirty again.

Further, in a feasible embodiment, the above operation S206 may further include:

operation A1, controlling the cleaning robot to clean along a left border.

When the cleaning robot cleans along the spiral path from outside to inside in the counterclockwise direction, due to that the cleaning place is usually a place such as a room where boundaries exist, cleaning along borders needs to be performed to clean borders of walls, furniture and the like, so as to fully clean the cleaning place. If the cleaning robot moves only according to a counterclockwise spiral path, it is possible that the wall border cannot be fully cleaned, therefore, operation A1 may be performed before or after operation S2061.

Figure 14:
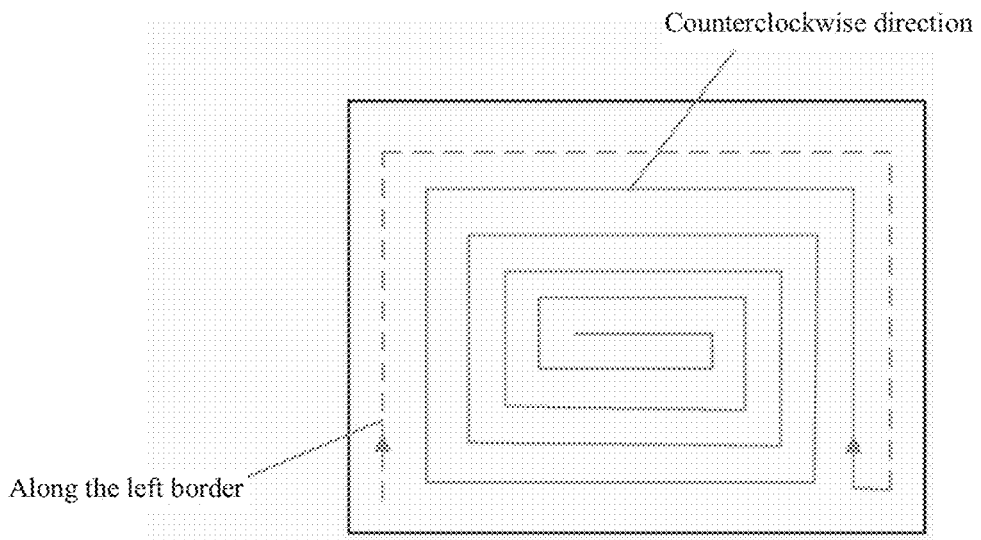
FIG. 14 is a demonstrated schematic diagram showing that the cleaning robot cleans along a left border firstly and then along a spiral path from inside to outside in the counterclockwise direction according to the present application.

In a specific embodiment, as shown in FIG. 14, the cleaning robot may be controlled to clean along a left border at first, and then to clean along the spiral path from outside to inside in the counterclockwise direction.

In addition, it should be understood that, based on different design requirements of actual applications, in different feasible implementations, of course the cleaning robot can be controlled to clean along the spiral path from outside to inside in the counterclockwise direction at first, then the cleaning robot is controlled to return to a border and clean along the left border. The cleaning control method of the present application does not specifically limit the order of implementing operations S2061 and A1.

Further, in a feasible embodiment, only the left side of the cleaning robot is provided with the target sweeping member, or only the target sweeping member on the left side of the cleaning robot is in a working state. Operation S206 may further include:

Operation S2062, controlling the cleaning robot to clean along the spiral path from inside to outside in a clockwise direction.

Figure 15:
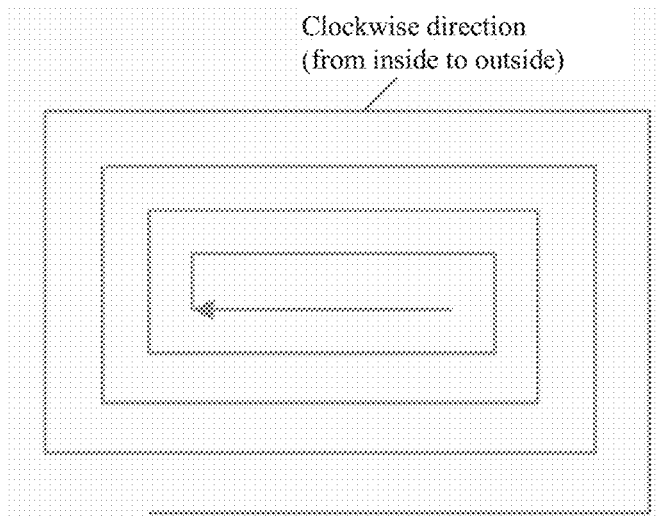
FIG. 15 is a demonstrated schematic diagram showing that the cleaning robot cleans along a spiral path from inside to outside in a clockwise direction according to the present application.

As shown in FIG. 15, when the cleaning robot cleans along the spiral path from inside to outside in the clockwise direction, the sweeping area of the sweeping member on the left side does not cover the current mopped area around the cleaning robot, and particularly does not cover the mopped area formed by the mopping member.

In this embodiment, the cleaning robot is controlled to clean along the spiral path from inside to outside in the clockwise direction, so that the sweeping area of the sweeping member on the left side cannot touch the current mopped area around the cleaning robot, to prevent the sweeping member touching the mopped area and making the mopped area dirty again, and also to prevent the sweeping member from getting wet by touching the mopped area.

In a feasible embodiment, there are more than one or two sweeping members arranged on the cleaning robot, and the sweeping members are located on the left side of the cleaning robot. Then, the cleaning robot is controlled to clean along the spiral path from inside to outside in the clockwise direction.

In a specific implementation, the cleaning robot is provided with a side brush, and the side brush is arranged on the left side of the cleaning robot. The cleaning robot can be controlled to clean along the spiral path from inside to outside in the clockwise direction, and the side brush does not cause the current mopped area around the cleaning robot getting dirty again.

Alternatively, in a feasible embodiment, the cleaning robot has more than two sweeping members, and the sweeping members are distributed on the left side and the right side of the cleaning robot. The cleaning robot can switch the sweeping member on the left side to the working state, or switch the sweeping member on the right side to the non-working state, or the cleaning robot detects that the sweeping member on the right side is damaged or failed, thus the cleaning robot is controlled to clean along the spiral path from inside to outside in the clockwise direction.

In a specific implementation, both the left side and the right side of the cleaning robot are provided with side brushes. The cleaning robot can switch the side brush on the left side to the working state, or switch the side brush on the right side to the non-working state, or the cleaning robot detects that the sweeping member on the right side is damaged or faulty, thus the cleaning robot is controlled to clean along the spiral path from inside to outside in the clockwise direction, and the side brush does not cause the current mopped area around the cleaning robot getting dirty again.

Further, in a feasible embodiment, only the right side of the cleaning robot is provided with the target sweeping member, or only the target sweeping member located on the right side of the cleaning robot is in the working state. Operation S206 may further include:

operation S2063, controlling the cleaning robot to clean along the spiral path from outside to inside in the clockwise direction.

Only the sweeping member located on the right side of the cleaning robot is in the working state, which may include the following situations: the cleaning robot switches the sweeping member on the right side to the working state, or the cleaning robot switches the sweeping member on the left side to the non-working state, or the cleaning robot detects that the sweeping member on the left side is damaged or faulty. There may be other situations where the sweeping member on the right side is in the working state, and details are not provided herein.

Figure 16:
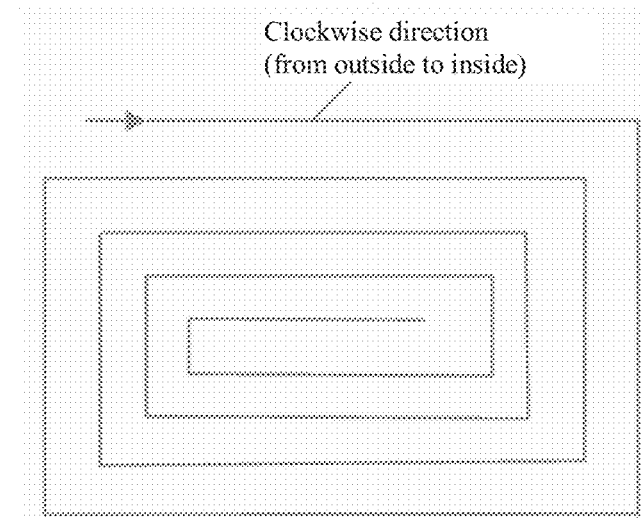
FIG. 16 is a demonstrated schematic diagram showing that the cleaning robot cleans along a spiral path from outside to inside in the clockwise direction according to the present application.

As the clockwise spiral path shown in FIG. 16, when the cleaning robot cleans along the spiral path from outside to inside in the clockwise direction, the sweeping area of the sweeping member on the right side does not cover the current mopped area around the cleaning robot, and especially does not cover the mopped area formed by the mopping member.

In this embodiment, the cleaning robot is controlled to clean along the spiral path from outside to inside in the clockwise direction, so that the sweeping area of the sweeping member on the right side cannot cover the current mopped area around the cleaning robot, to prevent the sweeping member touching the mopped area and making the mopped area dirty again, and also to prevent the sweeping member from getting wet by touching the mopped area.

In a feasible embodiment, there are more than one or two sweeping members arranged on the cleaning robot, and the sweeping members are located on the right side of the cleaning robot. Then, the cleaning robot is controlled to clean along the spiral path from outside to inside in the clockwise direction.

In a specific implementation, the cleaning robot is provided with a side brush, and the side brush is arranged on the right side of the cleaning robot. The cleaning robot can be controlled to clean along the spiral path from outside to inside in the clockwise direction, and the side brush does not cause the current mopped area around the cleaning robot getting dirty again.

Alternatively, in a feasible embodiment, the cleaning robot has more than two sweeping members, and the sweeping members are distributed on the left side and the right side of the cleaning robot. The cleaning robot can switch the sweeping member on the right side to the working state, or switch the sweeping member on the left side to the non-working state, or the cleaning robot detects that the sweeping member on the left side is damaged or failed, thus the cleaning robot is controlled to clean along the spiral path from outside to inside in the clockwise direction.

In a specific implementation, the left side and the right side of the cleaning robot are provided with side brushes. The cleaning robot can switch the side brush on the right side to the working state, or switch the sweeping member on the left to the non-working state, or the cleaning robot detects that the sweeping member on the left side is damaged or faulty, thus the cleaning robot is controlled to clean along the spiral path from outside to inside in the clockwise direction, and the side brush does not cause the current mopped area around the cleaning robot getting dirty again.

Further, in a feasible embodiment, the above operation S206 may further include:

operation A2, controlling the cleaning robot to clean along a right border.

When the cleaning robot cleans along the spiral path from outside to inside in the clockwise direction, due to that the cleaning place is usually a place such as a room where boundaries exist, cleaning along borders needs to be performed to clean borders of walls, furniture and the like, so as to hilly clean the cleaning place. If the cleaning robot moves only according to a clockwise spiral path, it is possible that the wall border cannot be fully cleaned, therefore, operation A2 may be performed before or after operation S2063.

Figure 17:
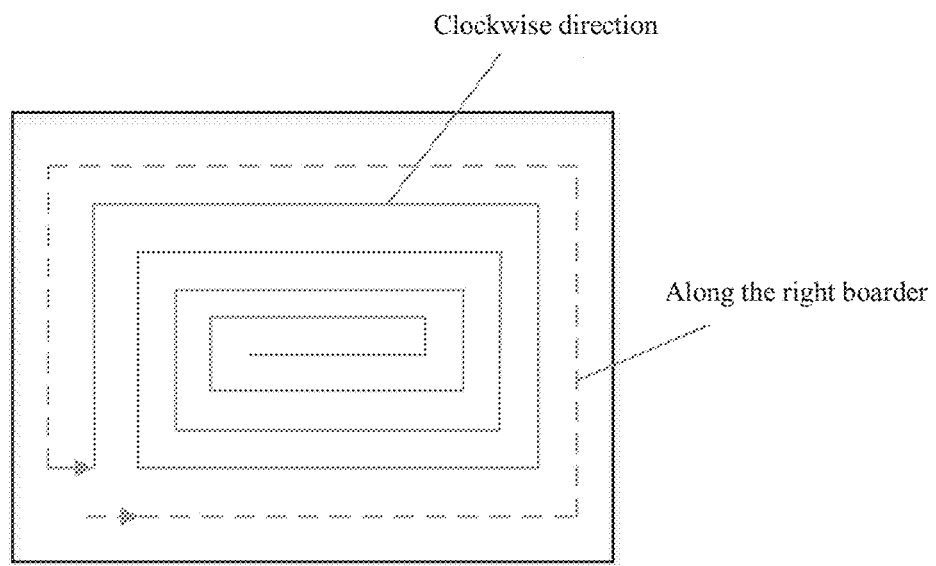
FIG. 17 is a demonstrated schematic diagram showing that the cleaning robot cleans along a right border firstly, and then along a spiral path from outside to inside in the clockwise direction according to the present application.

In a specific embodiment, as shown in FIG. 17, the cleaning robot may be controlled to dean along a right border at first, and then to clean along the spiral path from inside to outside in the counterclockwise direction, or the cleaning robot may be controlled to clean along the spiral path from inside to outside in the counterclockwise direction at first, and then to clean along the right border. That is, the cleaning control method of the present application does not specifically limit the execution sequence of operations S2063 and A2.

Further, in a feasible embodiment, only the right side of the cleaning robot is provided with at least one sweeping member, or the left side and the right side of the cleaning robot are both provided with a sweeping member, but only the sweeping member located on the right side of the cleaning robot is in the working state. The above operation may further include:

Operation S2064, controlling the cleaning robot to clean along the spiral path from inside to outside in the counterclockwise direction.

Figure 18:
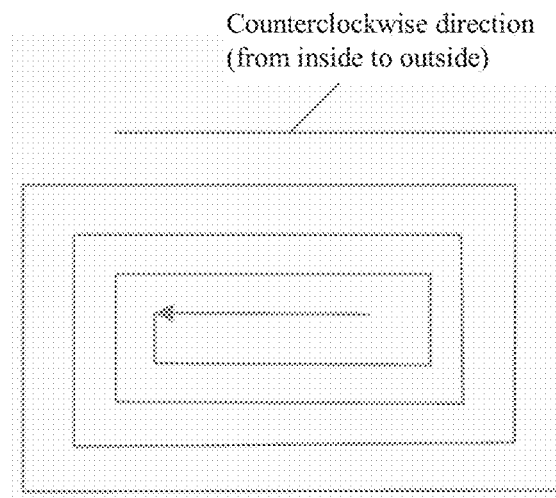
FIG. 18 is a demonstrated schematic diagram showing that the cleaning robot cleans along a spiral path from inside to outside in the counterclockwise direction according to an embodiment of the present application.

As shown in FIG. 18, when the cleaning robot cleans along the spiral path from inside to outside in the counterclockwise direction, the sweeping area of the sweeping member on the right side does not cover the current mopped area around the cleaning robot, and in particular, does not cover the mopped area formed by the mopping member.

In this embodiment, the cleaning robot is controlled to clean along the spiral path from inside to outside in the counterclockwise direction, so that the sweeping area of the sweeping member on the right side cannot cover the current mopped area around the cleaning robot, to prevent the sweeping member touching the mopped area and making the mopped area dirty again, and also to prevent the sweeping member from getting wet by touching the mopped area.

In a feasible embodiment, there are more than one or two sweeping members arranged on cleaning robot, and the sweeping members are located on the right side of the cleaning robot. Then, the cleaning robot is controlled to clean along the spiral path from inside to outside in the counterclockwise direction.

In a specific implementation, the cleaning robot is provided with a side brush, the side brush is arranged on the right side of the cleaning robot. The cleaning robot can be controlled to clean along the spiral path from inside to outside in the counterclockwise direction, and the side brush does not cause the current mopped area on the lateral side of the cleaning robot getting dirty again.

Alternatively, in a feasible embodiment, the cleaning robot has more than two sweeping members, and the sweeping members are distributed on the left side and the right side of the cleaning robot. The cleaning robot can switch the sweeping member on the right side to the working state, or switch the sweeping member on the left side to the non-working state, or the cleaning robot detects that the sweeping member on the left side is damaged or failed, thus the cleaning robot is controlled to clean along the spiral path from inside to outside counterclockwise.

In a specific implementations, both the left side and the right side of the cleaning robot are provided with side brushes. The cleaning robot can switch the side brush on the right side to the working state, or switch the sweeping member on the left side to the non-working state, or the cleaning robot detects that the sweeping member on the left side is damaged or failed, thus the cleaning robot is controlled to clean along the spiral path from inside to outside in the counterclockwise direction, and the side brush does not cause the current mopped area around the cleaning robot getting dirty again.

Figure 19:
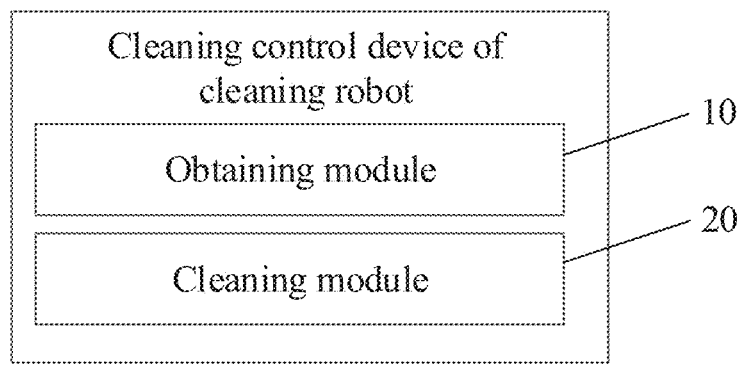
FIG. 19 is a schematic diagram of functional modules of a cleaning control device according to the present application.

Further, the present application provides a cleaning control device. Referring to FIG. 19, FIG. 19 is a schematic diagram of functional modules according to an embodiment of the present application. The cleaning control device of the present application is applied to a cleaning robot, and the cleaning robot includes a sweeping member and a mopping member. As shown in FIG. 19, the cleaning control device of the present application includes:

an obtaining module 10 configured to obtain an operating parameter for the cleaning robot to clean;
a cleaning module 20 configured to control, according to the operating parameter, in a process of a sweeping member and a mopping member performing cleaning together, a sweeping area formed in real time by the sweeping member, a mopping area formed in real time by the mopping member and the mopped area formed on a lateral side of the cleaning robot to meet a first preset relationship, the first preset relationship including that a boundary which is close to the mopped area among boundaries of the sweeping area has a first distance from the mopping area, a boundary which is close to the mopped area among boundaries of the mopping area has a second distance from the mopped area, and the first distance is greater or equal to the second distance.

Further, the cleaning module 20 is further configured to controlling according to the operating parameter, in the process of the sweeping member and the mopping member performing cleaning together, the sweeping area formed in real time by the sweeping member, the mopping area formed in real time by the mopping member and the mopped area formed on the lateral side of the cleaning robot to meet a second preset relationship, the second preset relationship including that a boundary which is away from the mopped area among the boundaries of the sweeping area has a third distance from the mopped area, a boundary which is away from the mopped area among the boundaries of the mopping area has a fourth distance from the mopped area, and the third distance is greater than or equal to the fourth distance.

Further, the cleaning module 20 is further configured to:
controlling the first distance to be greater than or equal to zero; to prevent the sweeping area from touching the mopped area; and/or
controlling the second distance to be less than or equal to zero, to snake the mopping area adjacent to or cover the mopped area.

Further, the cleaning module 20 is specifically configured to:
controlling a position or an operating state of the mopping member, to make the mopping area close to the mopped area; and/or
controlling a position or an operating state of the sweeping member, to make the sweeping area stay away from the mopped area.

Further, the operating parameter is the position of the sweeping member, and the position of the sweeping member is on at least one side of a left side and a right side of the cleaning robot. The sweeping area formed in real time by the sweeping member, the mopping area formed in real time by the mopping member and the mopped area formed on the lateral side of the cleaning robot meet the first preset relationship. The cleaning module is specifically configured to:
controlling a target sweeping member close to the mopped area to not work, be in a designated area, or be lifted,
where a sweeping area of the target sweeping member exceeds or is aligned with a target boundary extension line of the mopping area; and the target boundary extension line is a boundary extension line parallel to an advancing direction of the cleaning robot.

Target sweeping members are distributed on the left side and the right side of the cleaning robot, and the target sweeping members close to the mopped area not work, are located in the designated area, or are lifted. The cleaning module 20 is specifically configured to:
in response to that the cleaning robot cleans along a sidewinding path, alternately controlling one of the target sweeping members on the left side and the right side of the cleaning robot, which is close to the mopped area, to not work, be in a designated area, or be lifted.

Further, the target sweeping members are distributed on the left side and the right side of the cleaning robot, and the target sweeping members close to the mopped area not work, are located in the designated area, or are lifted. The cleaning module 20 are specifically configured to:

in response to that the cleaning robot cleans along a spiral path, controlling the target sweeping member of the cleaning robot, which is close to the mopped area, to not work, be kept in the designated area, or be lifted continuously.

Further, the operating parameter is a relative position relationship between the sweeping member and the mopping member, and the cleaning module 20 is specifically configured to:

during a cleaning process, controlling the sweeping member and/or the mopping member to carry out at least one of the actions: translating, floating, swing, and being lifted, so as to change the sweeping area and/or the mopping area in a direction perpendicular to the advancing direction of the cleaning robot.

Further, the cleaning module 20 is further configured to:

in response to that the cleaning robot cleans along the sidewinding path;

alternately controlling the sweeping members, which are close to the mopped area, to be away from the mopped area.

Further, the operating parameter is a relative position relationship between the sweeping member and the mopping member, and the cleaning module 20 is specifically configured to:

adjusting the relative position relationship between a target sweeping member and the mopping member, where the sweeping area of the target sweeping member exceeds or is aligned with a target boundary extension line of the mopping area, and the target boundary extension line is a boundary extension line parallel to the advancing direction of the cleaning robot; and controlling the target sweeping member and the mopping member to clean after the relative position relationship is adjusted, where the sweeping area formed in real time by the sweeping member after the relative position relationship is adjusted, the mopping area formed in real time by the mopping member after the relative position relationship is adjusted and the mopped area meet the first preset relationship.

Further, the relative position relationship between the target sweeping member and the mopping member is adjusted, and the cleaning module 20 is specifically configured to:

controlling the target sweeping member and/or the mopping member to carry out at least one of the actions: translating, floating, swing, and being lifted, so as to change the sweeping area of the sweeping member and/or the mopping area of the mopping member in a direction perpendicular to the advancing direction of the cleaning robot.

Further, the relative position relationship between the target sweeping member and the mopping member is adjusted, and the cleaning module 20 is specifically configured to:

in response to that the cleaning robot cleans along a sidewinding path, alternately controlling the target sweeping members, which are close to the mopped area, to be away from the mopped area.

Further, the operating parameter is a spiral path, one side of the cleaning robot is provided with a target sweeping member, a sweeping area of the target sweeping member exceeds or is aligned with a target boundary extension line of the mopping area, and the target boundary extension line is a boundary extension line parallel to the advancing direction of the cleaning robot. The cleaning module 20 is specifically configured to:

controlling the cleaning robot to clean along the spiral path, and the sweeping area formed in real time by the sweeping member, the mopping area formed in real time by the mopping member and the mopped area formed on the lateral side of the cleaning robot meet the first preset relationship.

Further, only the left side of the cleaning robot is provided with the target sweeping member, or only the target sweeping member located on the left side of the cleaning robot is in a working state. The cleaning robot is controlled to clean along the spiral path, and the cleaning module 20 is specifically configured to:

controlling the cleaning robot to clean along the spiral path from outside to inside in a counterclockwise direction.

Further, the cleaning module 20 is configured to:

controlling the cleaning robot to clean along a left border.

Further, only the left side of the cleaning robot is provided with the target sweeping member, or only the target sweeping member located on the left side of the cleaning robot is in a working state. The cleaning module 20 is specifically configured to:

controlling the cleaning robot to clean along the spiral path from inside to outside in a clockwise direction.

Further, only the right side of the cleaning robot is provided with the target sweeping member, or only the target sweeping member located on the right side of the cleaning robot is in a working state. The cleaning module 20 is specifically configured to:

controlling the cleaning robot to clean along the spiral path from outside to inside in the clockwise direction.

Further, the cleaning module 20 is configured to:

controlling the cleaning robot to clean along a right border.

Further, only the right side of the cleaning robot is provided with the target sweeping member, or only the target sweeping member located on the right side of the cleaning robot is in a working state. The cleaning module 20 is specifically configured to:

controlling the cleaning robot to clean along the spiral path from inside to outside in the counterclockwise direction.

The functions of the functional modules in the cleaning control device correspond to the operations in the foregoing cleaning control method embodiments, and therefore, the functions and implementation processes of the modules are not repeated herein.

The present application further provides a computer storage medium. A cleaning control program of a cleaning robot is stored in the computer storage medium. When the cleaning control program of the cleaning robot is executed by a processor, the operations of the cleaning control method according to any one of the above embodiments are realized.

The embodiments of the computer storage medium of the present application are basically the same as those of the above-mentioned cleaning control methods, which will not be repeated here.

The present application further provides a computer program product. The computer program product includes a computer program. When the computer program is executed by a processor, the operations of the cleaning control method according to any one of the above embodiments are realized.

The embodiments of the computer program of the present application are basically the same as those of the above-mentioned cleaning control methods, which will not be repeated here.

It should be noted that the terms "including," "comprising" or any other variation thereof herein are intended to cover a non-exclusive inclusion, such that a process, method, article, or system that includes a series of elements not only including those elements, but also including other elements not expressly listed, or an element inherent to such a process, method, article, or system. In the absence of more limitations, the element defined by the sentence "include one" does not exclude the presence of additional identical elements in a process, a method, an article, or a system that includes the element.

The serial numbers of the embodiments of the present application are only for description, and do not represent advantages or disadvantages of the embodiments.

Through the description of the above embodiments, a person skilled in the art may clearly understand that the method in the above embodiments may be implemented by means of software plus a necessary general hardware platform, of course may be implemented by hardware, but in many cases, the former is preferred. Based on such an understanding, the technical solution of the present application itself or part of the technical solution which contributes to the prior art may be embodied in the form of a software product, and the computer software product is stored in a storage medium (such as a ROM/RAM, a magnetic disk, or an optical disk) as described above, and includes several instructions for causing a mobile device (which may be a mobile phone, a computer, a server, or a network device, etc.) to perform the method according to various embodiments of the present disclosure.

The above is only a preferred embodiment of the present application, and is not intended to limit the claimed scope of the present application. Any equivalent structure or equivalent process transformation made using the description and the accompanying drawings of the present application, or any direct or indirect application in other related technical fields, is intended to be included in the claimed scope of the present application.

What is claimed is:

1. A cleaning control method, applied to a cleaning robot comprising a sweeping member and a mopping member, wherein the sweeping member cooperates with the mopping member, the method comprises:
   acquiring an operating parameter for the cleaning robot to perform cleaning;
   according to the operating parameter, controlling the sweeping member and the mopping member to form the following (a)-(c) areas to meet a first preset relationship,
   (a) a sweeping area defined in real time by the sweeping member during sweeping,
   (b) a mopping area defined in real time by the mopping member during mopping,
   (c) a mopped area which is already cleaned on a lateral side of the cleaning robot, and
   wherein:
      a first distance is formed between a boundary of the sweeping area which is the closest to the mopped area and a boundary of the mopped area which is the closest to the sweeping area,
      a second distance is formed between a boundary of the mopping area which is the closest to the mopped area and a boundary of the mopped area which is the closest to the mopping area, and
   wherein the first preset relationship indicates the first distance is greater or equal to the second distance.

2. The cleaning control method as claimed in claim 1, further comprising:
   according to the operating parameter, controlling the sweeping member and the mopping member to form the above (a)-(c) areas to meet a second preset relationship,
   wherein:
      a third distance is formed between a boundary of the sweeping area which is the furthest to the mopped area and a boundary of the mopped area which is the closest to the sweeping area,
      a fourth distance is formed between a boundary of the mopping area which is the furthest to the mopped area and a boundary of the mopped area which is the closest to the mopping area, and
   wherein the second preset relationship indicates the third distance is greater than or equal to the fourth distance.

3. The cleaning control method as claimed in claim 1, further comprising:
   controlling at least one of the sweeping member and the mopping member to adjust the first distance to be greater than or equal to zero, to prevent the sweeping area from touching the mopped area; and/or
   controlling at least one of the sweeping member and the mopping member to adjust the second distance to be less than or equal to zero, to make the mopping area adjacent to or cover the mopped area.

4. The cleaning control method as claimed in claim 1, wherein the controlling the sweeping member and the mopping member to form the (a)-(c) areas to meet the first preset relationship further comprises:
   controlling a position or an operating state of the mopping member, to make the mopping area close to the mopped area; and/or
   controlling a position or an operating state of the sweeping member, to make the sweeping area stay away from the mopped area.

5. The cleaning control method as claimed claim 1, wherein,
   the operating parameter is a position of the sweeping member, which includes at least one of: a left side and a right side of the cleaning robot,
   wherein the controlling the sweeping member and the mopping member to form the (a)-(c) areas to meet the first preset relationship further comprises:
      controlling a target sweeping member close to the mopped area to not work,
      limiting the target sweeping member staying in a designated area, or
      lifting the target sweeping member;
   wherein a sweeping area of the target sweeping member exceeds or is aligned with a target boundary extension line of the mopping area, and the target boundary extension line is a boundary extension line parallel to an advancing direction of the cleaning robot.

6. The cleaning control method as claimed in claim 5, wherein target sweeping members are distributed on the left side and the right side of the cleaning robot, and the controlling the target sweeping member close to the mopped area to not work, be limited in the designated area or be lifted comprises:
   in accordance with the cleaning robot cleaning along a sidewinding path, controlling the target sweeping member which is the closest to the mopped area among the target sweeping members on the left side and the right side of the cleaning robot to alternatively:
- be controlled to not work,
- be limited in a designated area, or
- be lifted.

7. The cleaning control method as claimed in claim 5, wherein target sweeping members are distributed on the left side and the right side of the cleaning robot, and the controlling the target sweeping member close to the mopped area to not work, be limited in the designated area or be lifted comprises:
  in accordance with the cleaning robot cleaning along a spiral path, controlling the target sweeping member of the cleaning robot, which is the closest to the mopped area to continuously:
  - not work,
  - stay in the designated area, or
  - keep being lifted.

8. The cleaning control method as claimed in claim 1, wherein the operating parameter is a relative position relationship between the sweeping member and the mopping member, and the controlling the sweeping member and the mopping member to form the (a)-(c) areas to meet the first preset relationship further comprises:
  controlling the sweeping member and/or the mopping member to carry out at least one of the actions: translating, floating, swing, and being lifted, so as to change the sweeping area of the sweeping member and/or the mopping area of the mopping member in a direction perpendicular to an advancing direction of the cleaning robot.

9. The cleaning control method as claimed in claim 8, further comprising:
  in accordance with the cleaning robot cleaning along a sidewinding path, alternately controlling the sweeping member close to the mopped area to stay away from the mopped area.

10. The cleaning control method as claimed claim 1, wherein the operating parameter is a relative position relationship between the sweeping member and the mopping member, and the controlling the sweeping member and the mopping member to form the (a)-(c) areas to meet the first preset relationship further comprises:
  adjusting a relative position relationship between a target sweeping member and the mopping member, wherein a sweeping area of the target sweeping member exceeds or is aligned with a target boundary extension line of the mopping area, and the target boundary extension line is a boundary extension line parallel to an advancing direction of the cleaning robot;
  controlling the target sweeping member and the mopping member to clean after the relative position relationship is adjusted; and
  adjusting the sweeping member and the mopping member to form the (a)-(c) areas to meet the first preset relationship.

11. The cleaning control method as claimed in claim 10, wherein the adjusting the relative position relationship between the target sweeping member and the mopping member further comprises:
  controlling the target sweeping member and/or the mopping member to carry out at least one of the actions: translating, floating, swing, and being lifted, so as to make the sweeping area of the sweeping member and/or the mopping area of the mopping member change in a direction perpendicular to the advancing direction of the cleaning robot.

12. The cleaning control method as claimed in claim 10, wherein the adjusting the relative position relationship between the target sweeping member and the mopping member comprises:
  in accordance with the cleaning robot cleaning along a sidewinding path, alternatively controlling target sweeping members, which are close to the mopped area, to stay away from the mopped area.

13. The cleaning control method as claimed in claim 1, wherein the operating parameter is a spiral path, and one side of the cleaning robot is provided with a target sweeping member, wherein a sweeping area of the target sweeping member exceeds or is aligned with a target boundary extension line of the mopping area,
  wherein the target boundary extension line is a boundary extension line parallel to an advancing direction of the cleaning robot; and
  wherein the controlling the sweeping member and the mopping member to form the (a)-(c) areas to meet the first preset relationship further comprises:
  controlling the cleaning robot to clean along the spiral path; and
  controlling the sweeping member and the mopping member to form the (a)-(c) areas to meet the first preset relationship.

14. The cleaning control method as claimed in claim 13, wherein only a left side of the cleaning robot is provided with the target sweeping member, or only the target sweeping member located on the left side of the cleaning robot is in a working state,
  wherein the controlling the cleaning robot to clean along the spiral path comprises:
  controlling the cleaning robot to clean along the spiral path from outside to inside in a counterclockwise direction, or controlling the cleaning robot to clean along the spiral path from inside to outside in a clockwise direction.

15. The cleaning control method as claimed in claim 13, wherein only a right side of the cleaning robot is provided with the target sweeping member, or only the target sweeping member located on the right side of the cleaning robot is in a working state,
  wherein the controlling the cleaning robot to clean along the spiral path comprises:
  controlling the cleaning robot to clean along the spiral path from outside to inside in a clockwise direction, or controlling the cleaning robot to clean along the spiral path from inside to outside in a counterclockwise direction.

16. The cleaning control method as claimed in claim 14, wherein before or after controlling the cleaning robot to clean along the spiral path from outside to inside in the counterclockwise direction, the method further comprises:
  controlling the cleaning robot to clean along a left border.

17. The cleaning control method as claimed in claim 15, wherein before or after the controlling the cleaning robot to clean along the spiral path from outside to inside in the clockwise direction, the method further comprises:
  controlling the cleaning robot to clean along a right border.

18. A cleaning robot comprising:
  a sweeping member,
  a mopping member,
  a memory having computer-executable instructions stored thereon, and a processor coupled to the memory and configured to execute the computer-executable instructions to:
   obtain an operating parameter for the cleaning robot to perform cleaning;
   according to the operating parameter, controlling the sweeping member and the mopping member to form the following (a)-(c) areas to meet a first preset relationship,
   (a) a sweeping area defined in real time by the sweeping member-during sweeping,
   (b) a mopping area defined in real time during mopping,
   (c) a mopped area which is already cleaned on a lateral side of the cleaning robot, and
wherein:
   a first distance is formed between a boundary of the sweeping area which is the closest to the mopped area and a boundary of the mopped area which is the closest to the sweeping area,
   a second distance is formed between a boundary of the mopping area which is the closest to the mopped area and a boundary of the mopped area which is the closest to the mopping area, and
   wherein the first preset relationship indicates the first distance is greater or equal to the second distance.

19. A non-transitory computer-readable storage medium storing a cleaning control program of a cleaning robot, which is executed by a processor of the cleaning robot, and cause the cleaning robot to implement operations including:
   acquiring an operating parameter for the cleaning robot to perform cleaning;
   according to the operating parameter, controlling the sweeping member and the mopping member to form the following (a)-(c) areas to meet a first preset relationship,
   (a) a sweeping area defined in real time by the sweeping member-during sweeping,
   (b) a mopping area defined in real time during mopping,
   (c) a mopped area which is already cleaned on a lateral side of the cleaning robot, and
wherein:
   a first distance is formed between a boundary of the sweeping area which is the closest to the mopped area and a boundary of the mopped area which is the closest to the sweeping area,
   a second distance is formed between a boundary of the mopping area which is the closest to the mopped area and a boundary of the mopped area which is the closest to the mopping area, and
   wherein the first preset relationship indicates the first distance is greater or equal to the second distance.

* * * * *